US009198458B2

(12) United States Patent
Bertone

(10) Patent No.: US 9,198,458 B2
(45) Date of Patent: Dec. 1, 2015

(54) APPARATUS AND METHODS FOR PRODUCING BEVERAGES

(71) Applicant: Bertone Holdings Inc., St. Laurent (CA)

(72) Inventor: Claudio Bertone, St. Leonard (CA)

(73) Assignee: BERTONE HOLDINGS INC., Quebec (CA)

( * ) Notice: Subject to any disclaimer, the term of this patent is extended or adjusted under 35 U.S.C. 154(b) by 351 days.

(21) Appl. No.: 13/913,785

(22) Filed: Jun. 10, 2013

(65) Prior Publication Data

US 2013/0269377 A1 Oct. 17, 2013

Related U.S. Application Data

(63) Continuation of application No. 12/741,182, filed as application No. PCT/CA2008/001943 on Nov. 5, 2008, now Pat. No. 8,459,043.

(60) Provisional application No. 60/985,439, filed on Nov. 5, 2007, provisional application No. 61/102,176, filed on Oct. 2, 2008.

(51) Int. Cl.
*F25D 3/08* (2006.01)
*A23L 3/36* (2006.01)
(Continued)

(52) U.S. Cl.
CPC . *A23L 3/36* (2013.01); *A23G 9/045* (2013.01); *A23G 9/28* (2013.01); *B67D 1/0043* (2013.01); *B67D 1/0053* (2013.01); *B67D 1/07* (2013.01);
(Continued)

(58) Field of Classification Search
CPC .............. F25D 3/02; F25C 1/00; F25C 5/187; F25C 5/002; F25C 5/005; B05C 17/00553; B67D 1/0857

USPC ............. 62/1, 137, 321, 344; 222/132, 145.6, 222/146.6
See application file for complete search history.

(56) References Cited

U.S. PATENT DOCUMENTS 3,441,176 A * 4/1969 Reynolds et al. ............. 222/640
3,702,666 A * 11/1972 Stano .......................... 222/129.4
(Continued)

FOREIGN PATENT DOCUMENTS

| EP | 1690481 | 8/2006 |
|---|---|---|
| WO | WO-0107847 | 2/2001 |
| WO | WO-2009091565 | 7/2009 |

OTHER PUBLICATIONS

International Search Report, Jan. 14, 2009.

*Primary Examiner* — Melvin Jones
(74) *Attorney, Agent, or Firm* — Clark Hill PLC

(57) ABSTRACT

An apparatus for producing beverages. The apparatus comprises a dispensing system, a mixing unit, and a control unit comprising a user interface, which interact to prepare a particular beverage when requested by a user. When the control unit receives user input requesting the particular beverage via the user interface, it causes the dispensing system to dispense various ingredients (e.g., fragmented ice, water, flavoring ingredients, milk product) that are mixed by the mixing unit in order to prepare the particular beverage, which is served in a cup. In various embodiments, the apparatus may produce frozen beverages that include fragmented ice (e.g., shaved or crushed ice) as one of their ingredients, such as slush beverages and smoothie beverages, and/or hot beverages that include heated water as one of their ingredients, such as coffee and flavored coffee beverages (e.g., French Vanilla, Mocha, etc.).

32 Claims, 13 Drawing Sheets

(51) Int. Cl.
*A23G 9/04* (2006.01)
*A23G 9/28* (2006.01)
*B67D 1/00* (2006.01)
*B67D 1/07* (2006.01)
*B67D 1/08* (2006.01)
*B67D 1/12* (2006.01)
*F25C 5/04* (2006.01)
*F25C 5/12* (2006.01)

(52) U.S. Cl.
CPC ............ *B67D 1/0884* (2013.01); *B67D 1/0888* (2013.01); *B67D 1/0894* (2013.01); *B67D 1/0895* (2013.01); *B67D 1/1236* (2013.01); *B67D 2001/0827* (2013.01); *B67D 2210/00076* (2013.01); *F25C 5/046* (2013.01); *F25C 5/12* (2013.01); *F25C 2700/02* (2013.01)

(56) References Cited

U.S. PATENT DOCUMENTS

| | | | |
|---|---|---|---|
| 4,276,750 | A | 7/1981 | Kawasumi |
| 5,619,901 | A | 4/1997 | Reese et al. |
| 5,799,832 | A * | 9/1998 | Mayo ............................ 222/135 |
| 5,960,701 | A * | 10/1999 | Reese et al. ...................... 99/275 |
| 6,342,260 | B2 | 1/2002 | Kolar et al. |
| 6,689,410 | B2 | 2/2004 | Gerber |
| 6,772,675 | B2 | 8/2004 | Ervin |
| 2007/0131711 | A1 | 6/2007 | Minard et al. |
| 2009/0186141 | A1 | 7/2009 | Almblad et al. |

\* cited by examiner

APPARATUS AND METHODS FOR PRODUCING BEVERAGES

CROSS-REFERENCE TO RELATED APPLICATIONS

This application is a continuation of U.S. patent application Ser. No. 12/741,182 filed on May 3, 2010 which claims priority to PCT/CA 2008/001943 filed Nov. 5, 2008, which claims priority to U.S. Provisional Patent Application No. 60/985,439 filed by C. Bertone on Nov. 5, 2007, and from U.S. Provisional Patent Application No. 61/102,176 filed by C. Bertone on Oct. 2, 2008 all of which are hereby incorporated by reference herein.

FIELD OF THE INVENTION

The invention relates generally to beverage production and, more particularly, to apparatus and methods for producing beverages.

BACKGROUND

Consumers want to enjoy a wide variety of beverages. One type of beverage that has become increasingly popular is "frozen beverages" (sometimes also called "iced beverages"), such as "slush" beverages and "smoothie" beverages, which have fragmented ice (e.g., shaved or crushed ice) as one of their ingredients.

Typically, frozen beverages are dispensed by a dispensing apparatus having one or more large product holding containers containing a large batch (e.g., 10 L) of frozen beverage product that is refrigerated and, for each container, a lever or other control activaable by a user to cause some of the frozen beverage product to flow out of the container and into a cup.

For such dispensing apparatus, and for each product holding container thereof, an operator (e.g., a store clerk) first has to prepare a liquid mixture, which in most cases is a liquid concentrate to which he/she adds water to obtain a correct ratio. This liquid mixture then has to be poured into the product holding container. The dispensing apparatus then has to be turned on to enable a freezing cylinder within the product holding container to begin freezing up the liquid mixture around the freezing cylinder. An auger of the dispensing apparatus is eventually activated to scrape ice formations from around the freezing cylinder. As this process continues, the liquid mixture in the product holding container becomes the frozen beverage product to be dispensed as frozen beverages. This conversion of the liquid mixture into the frozen beverage product typically takes about two (2) hours. In addition, when the dispensing apparatus has multiple product holding containers, this process needs to be repeated for each container. Moreover, once the batch of frozen beverage product in a product holding container is drawn down and empty, a new batch of product must be mixed and placed in the container and approximately two (2) hours later the product will be ready for serving.

In market segments in which such dispensing apparatus are most often utilized, namely the food service industry, the convenience store market and the fast food/quick serve restaurant market, counter space is of critical importance and very valuable property. As each beverage selection being offered is maintained in a separate product holding container, there are consequently several containers required to provide a variety of beverages from the dispensing apparatus. Therefore, with each new beverage offer added, the dispensing apparatus can increase in width by approximately six (6) inches. For this reason, this type of dispensing apparatus usually only contains two (2) or three (3) product holding containers. To provide additional flavors beyond three (3) thus normally requires the apparatus' operators to purchase an additional unit to hold additional product holding containers. However, in the aforementioned markets where counter space is a valuable commodity, the operators are not inclined to add any additional flavors to support extra beverage flavoring choices beyond three (3) because the equipment to provide extra choices beyond three (3) would take up too much additional counter space. Put another way, the incremental increase in returns from providing an extra flavor is not justified by the added revenues obtained from the use of additional counter space. As a result, operators have to turn away some customers who may appreciate alternate flavors because it wouldn't be worth the extra expense of taking up additional counter space.

In addition, with a dispensing apparatus typically requiring about two (2) hours to convert the liquid mixture into the frozen beverage product to be dispensed, there is a period of time during which product cannot be sold and as a result many sales may be lost as potential customers may approach the apparatus but cannot serve themselves a beverage.

Furthermore, the frozen beverage product contained within each product holding container has a shelf life associated to it such that, after a prescribed period of time that the product is in the container, it must be discarded and a new batch must be produced. As a result, not only are sales lost due to the freeze-down period of the product to be discarded, but there is a high percentage of waste associated to such a dispensing apparatus.

Moreover, a dispensing apparatus as described above can create numerous technical problems (e.g., gasket failures causing frozen beverage product to leak out the product holding container(s), potentially backing an auger drive motor risking damage) and an opportunity for the operator to affect the quality of the frozen beverage product. Because the operator initially prepares the liquid mixture, the ratios may not be measured correctly and, as a result, the customer may get a product that doesn't taste as it should. Worse still, incorrect ratios of beverage ingredients introduce the potential for the dispensing apparatus to freeze-up solid, risking damage thereto and additional lost sales.

Other types of dispensing apparatus for dispensing other types of beverages, such as hot beverages (e.g., flavored coffee), present their own drawbacks, some of which are analogous to those discussed above.

Accordingly, there is a need for improvements in apparatus and methods for producing beverages, particularly frozen beverages.

SUMMARY OF THE INVENTION

According to a first broad aspect, the invention provides an apparatus for producing a frozen beverage. The apparatus comprises: an ice supply unit for supplying a quantity of ice to produce multiple frozen beverages; an ice fragmentation unit for fragmenting a portion of the ice to produce fragmented ice; a flavor dispensing unit for storing a plurality of supplies of flavoring ingredients and for dispensing at least one of the flavoring ingredients; a mixing unit for mixing the fragmented ice and the at least one of the flavoring ingredients; and a control unit comprising a user interface, the control unit being responsive to user input requesting the frozen beverage for causing the ice fragmentation unit to produce the fragmented ice, the flavor dispensing unit to dispense the at least one of the flavoring ingredients and the mixing unit to mix the fragmented ice and the at least one of the flavoring ingredients.

According to a second broad aspect, the invention provides an apparatus for producing a beverage containing a plurality of ingredients. The apparatus comprises a plurality of stations comprising: at least one dispensing station for dispensing at least some of the ingredients into a container; and a mixing station for mixing the ingredients in the container to prepare the beverage. The apparatus also comprises: a transporting unit for transporting the container between the stations; and a control unit comprising a user interface, the control unit being responsive to user input requesting the beverage for generating control signals to cause the dispensing and the mixing the ingredients at the stations and cause the transporting unit to transport the container between the stations.

According to a third broad aspect, the invention provides an apparatus for producing a beverage. The apparatus comprises: a cup support for receiving a cup into which the beverage is to be served and for supporting the cup while the beverage is prepared; a cup detection unit for detecting the cup when the cup is received by the cup support; a dispensing system for dispensing into the cup a plurality of ingredients to prepare the beverage; a mixing unit for mixing the ingredients in the cup; and a control unit comprising a user interface, the control unit being responsive to user input requesting the beverage and to detection of the cup by the cup detection unit for causing the dispensing system to dispense the ingredients and the mixing unit to mix the ingredients.

According to a fourth broad aspect, the invention provides an apparatus for producing a beverage. The apparatus comprises: a dispensing system for dispensing into a container a plurality of ingredients to prepare the beverage; a mixing unit for mixing the ingredients in the container, the mixing unit comprising a mixing element configured to extend into the container and to mix the ingredients in the container; a sanitizing unit for sanitizing the mixing element after the mixing element has mixed the ingredients in the container; and a control unit comprising a user interface, the control unit being responsive to user input requesting the beverage for causing the dispensing system to dispense the ingredients, the mixing unit to mix the ingredients and the sanitizing unit to sanitize the mixing element.

According to a fifth broad aspect, the invention provides an apparatus for producing hot beverages and frozen beverages. The apparatus comprises a dispensing system for dispensing a plurality of ingredients, the dispensing system comprising: in ice supply unit for supplying ice and an ice fragmentation unit for fragmenting a portion of the ice to produce fragmented ice; a water heater for heating water from a water supply line to produce hot water; a flavor dispensing unit for storing a plurality of supplies of flavoring ingredients and for dispensing any of the flavoring ingredients. The apparatus also comprises a mixing unit for mixing the ingredients and a control unit comprising a user interface, the control unit being responsive to user input requesting a particular beverage for causing the dispensing system to dispense the ingredients and the mixing unit to mix the ingredients, wherein: when the particular beverage is a frozen beverage, the ingredients comprise fragmented ice and at least one of the flavoring ingredients; and when the particular beverage is a hot beverage, the ingredients comprise hot water and at least one of the flavoring ingredients.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which.

Figure 1:
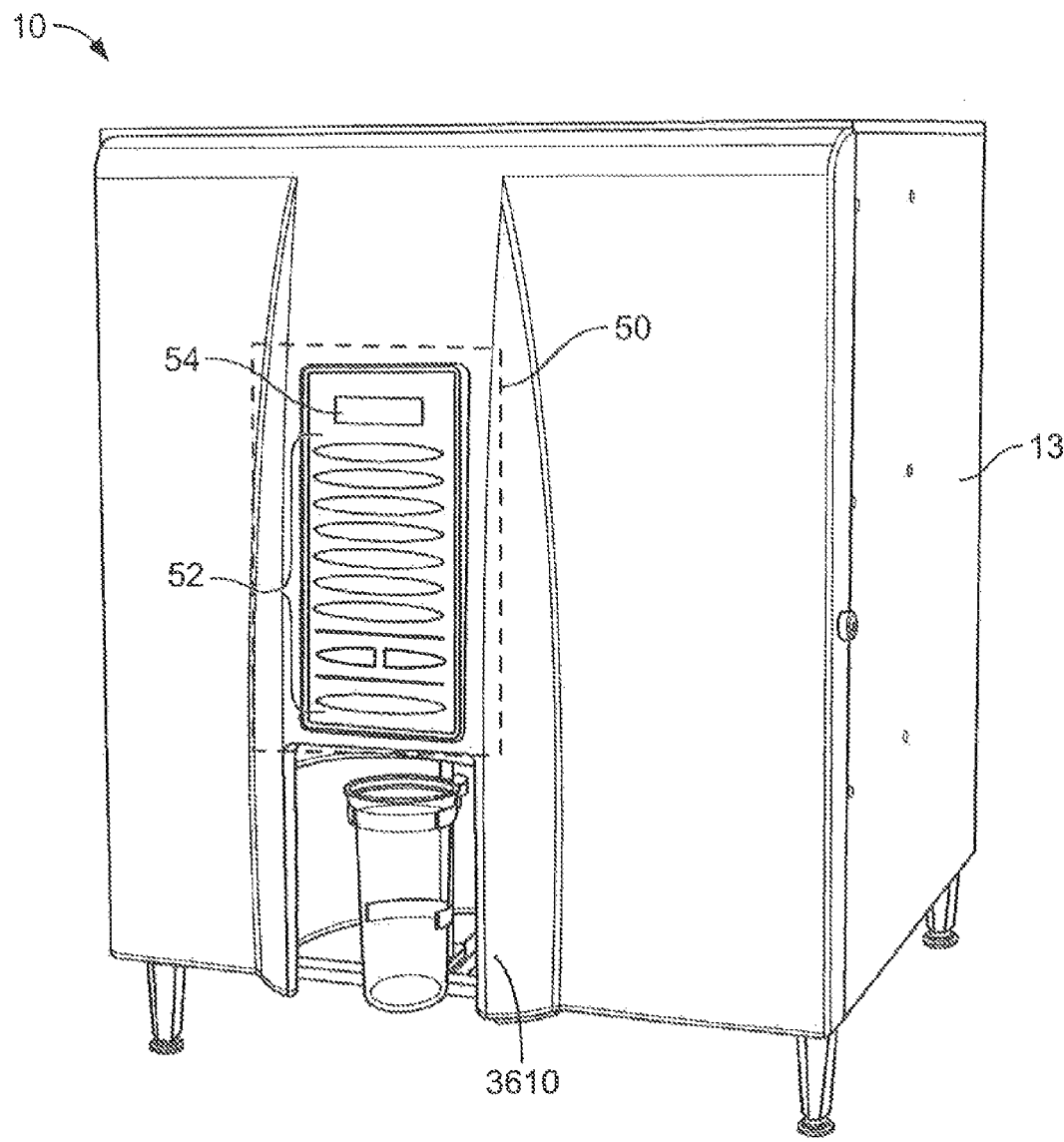
FIG. 1 shows an apparatus for producing beverages in accordance with an embodiment of the invention.
Figure 2:
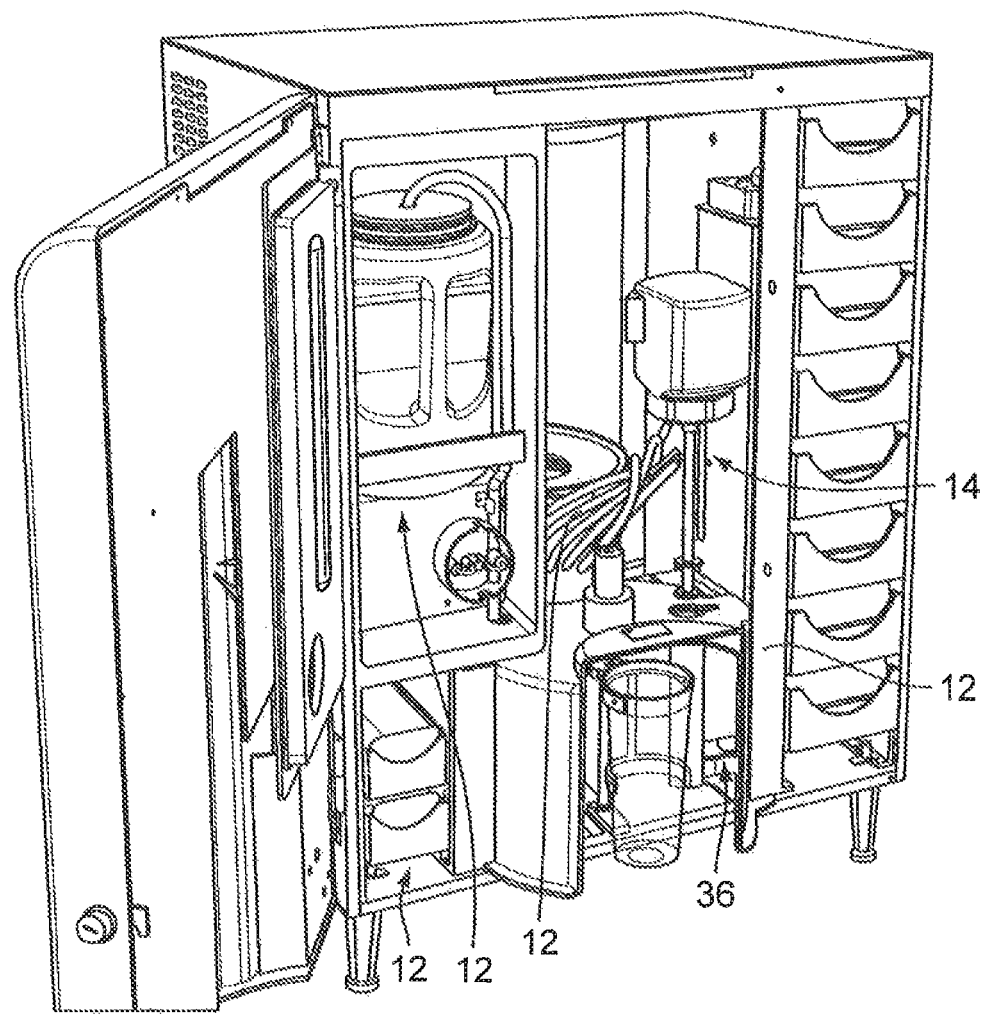
FIG. 2 shows the apparatus of FIG. 1, with a front panel open exposing internal components of the apparatus.
Figure 3:
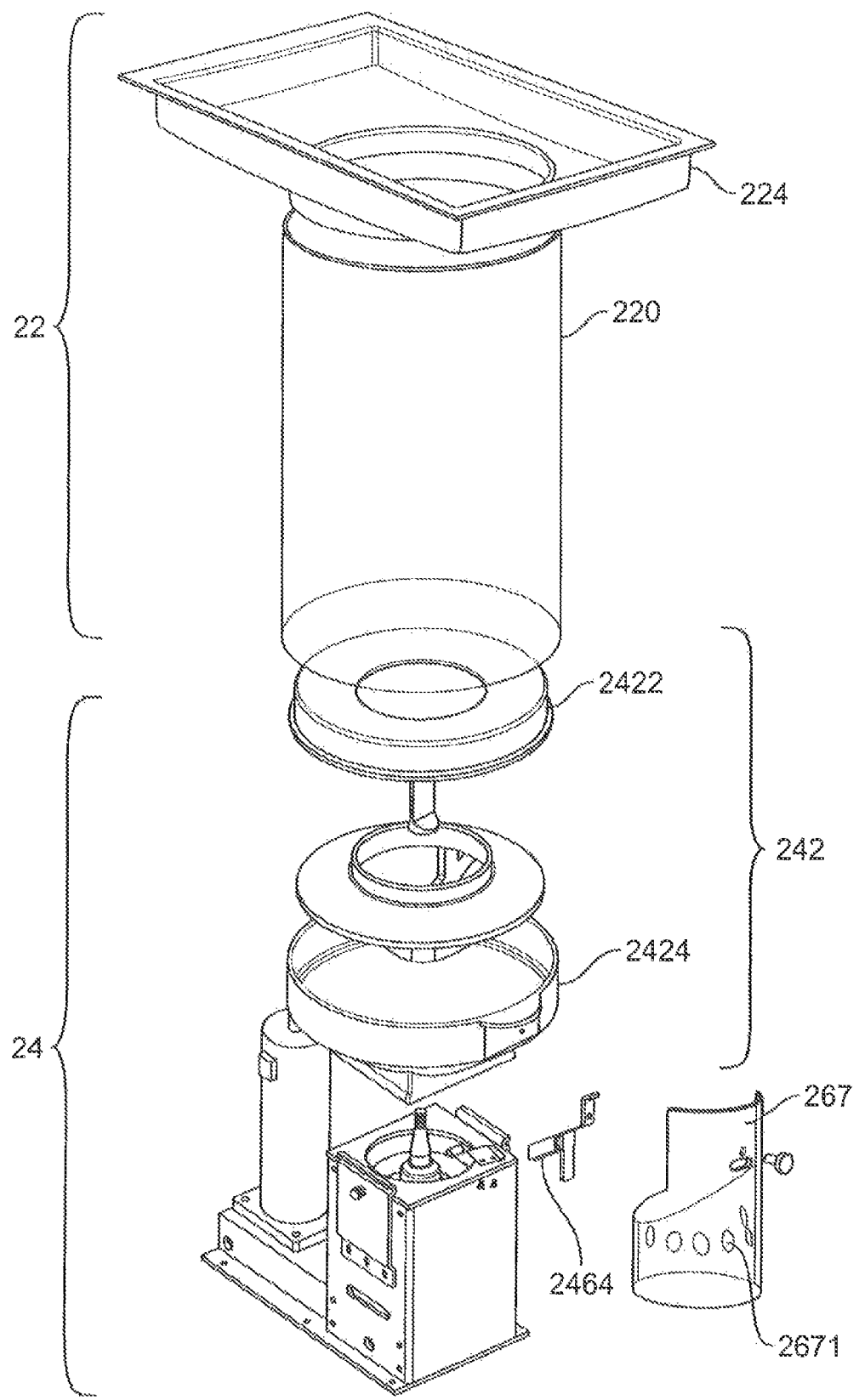
FIG. 3 shows an ice supply unit and an ice fragmentation unit of the apparatus of FIG. 1.
Figure 4:
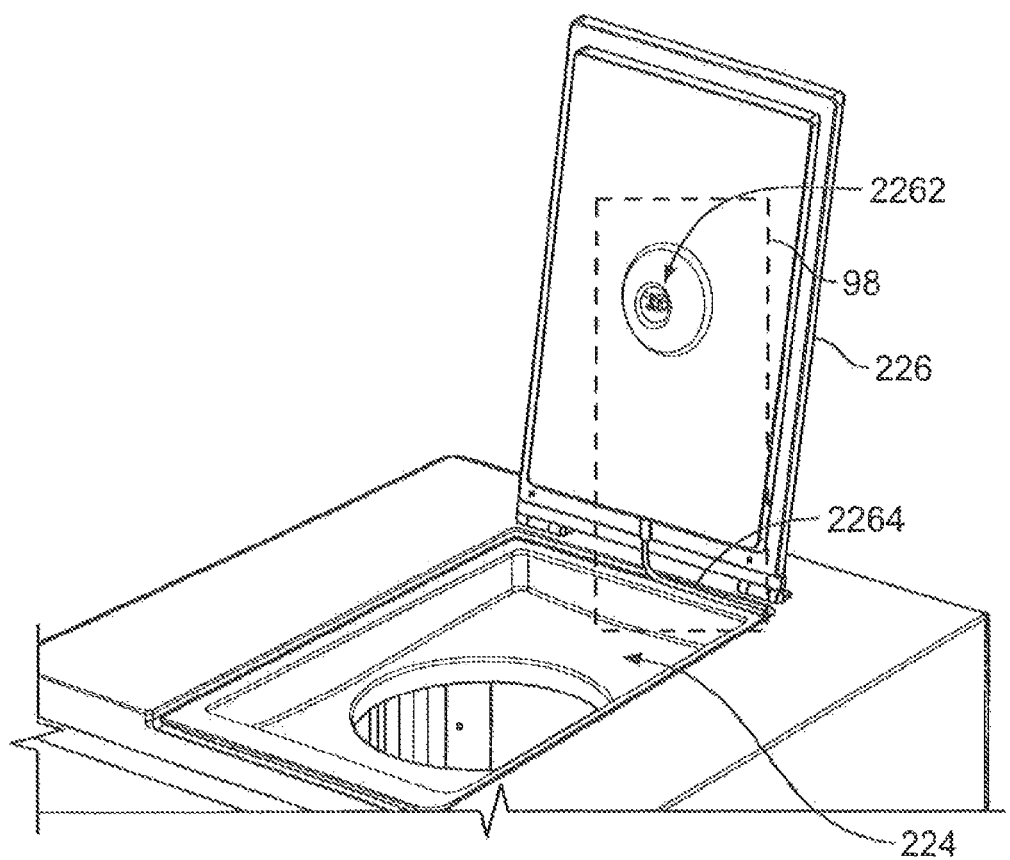
FIG. 4 shows a shower unit of the apparatus of FIG. 1.
Figure 5:
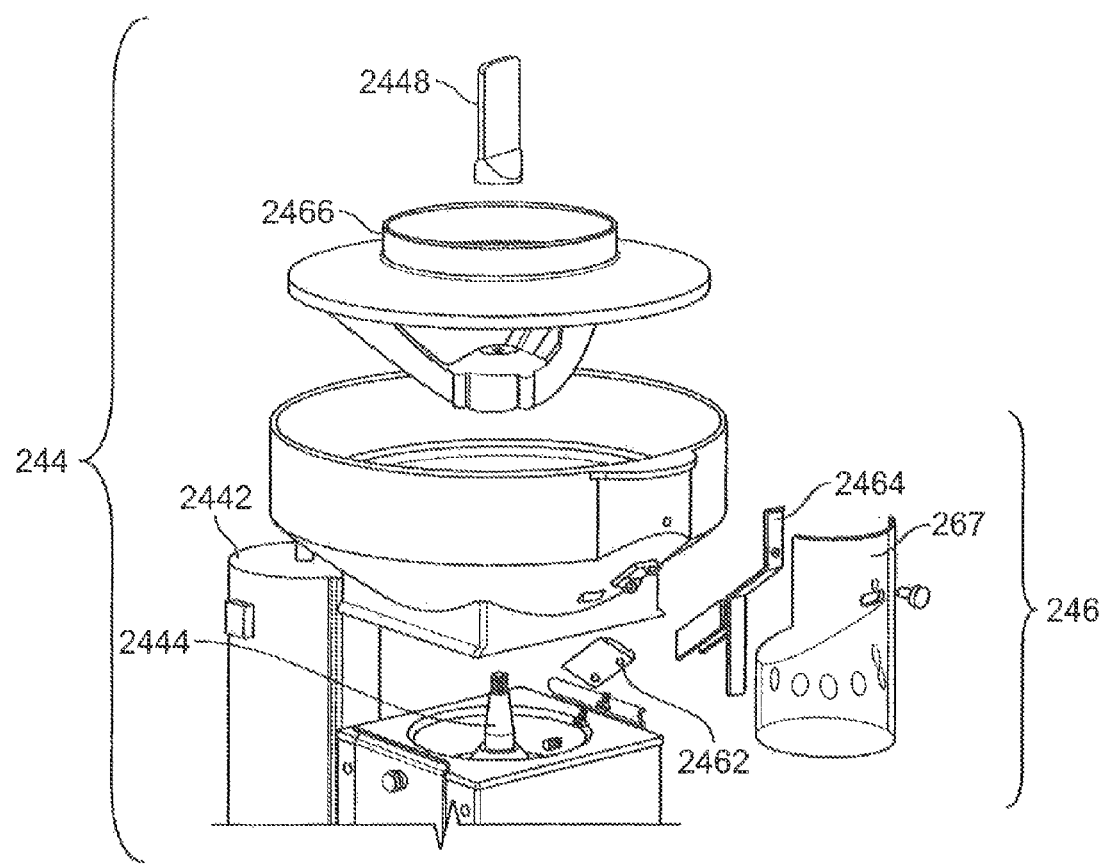
FIG. 5 shows components of the ice fragmentation unit.
Figure 6:
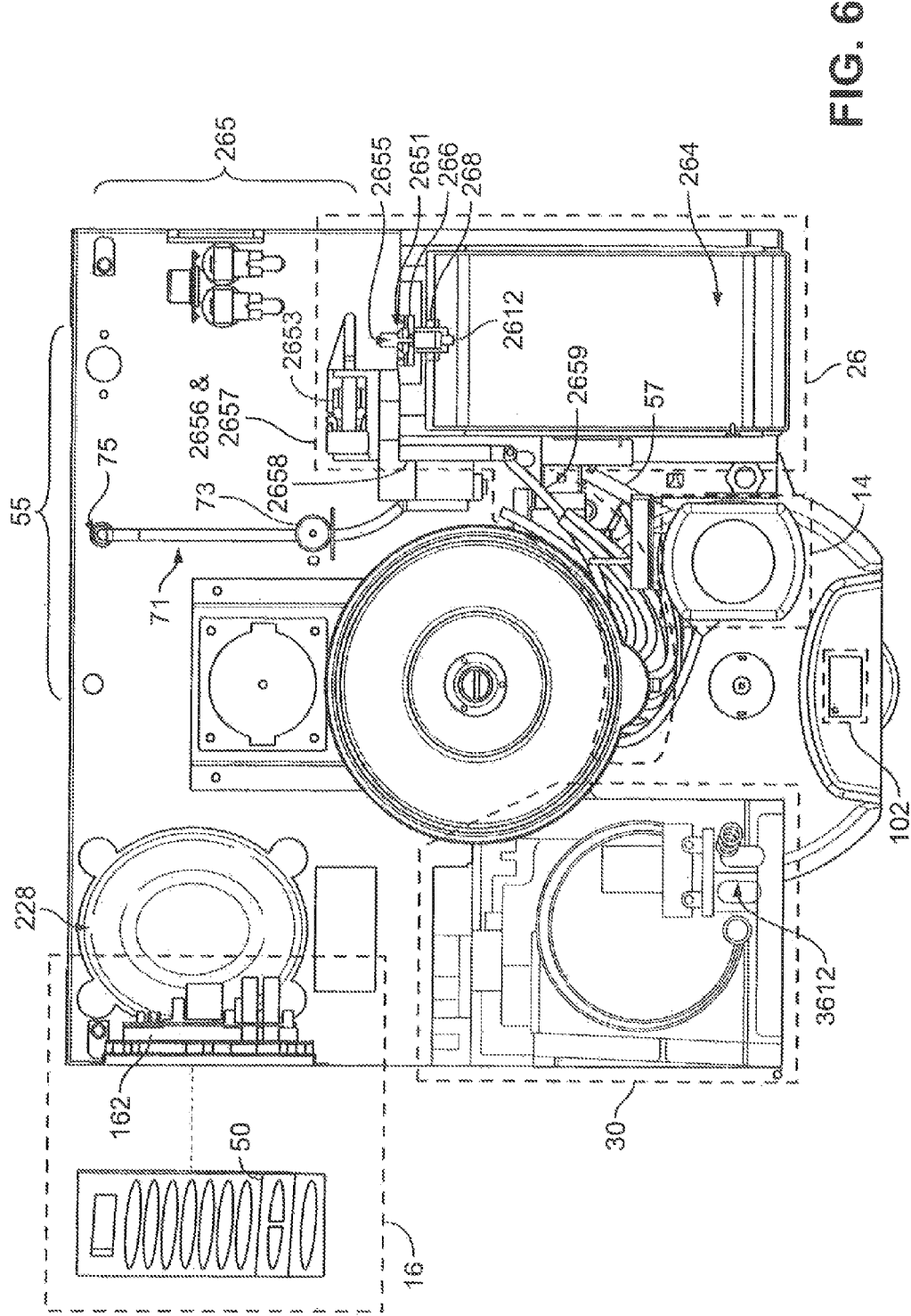
FIG. 6 shows various components of the apparatus of FIG. 1, including components of a flavor dispensing unit and a milk product dispensing unit.
Figure 7:
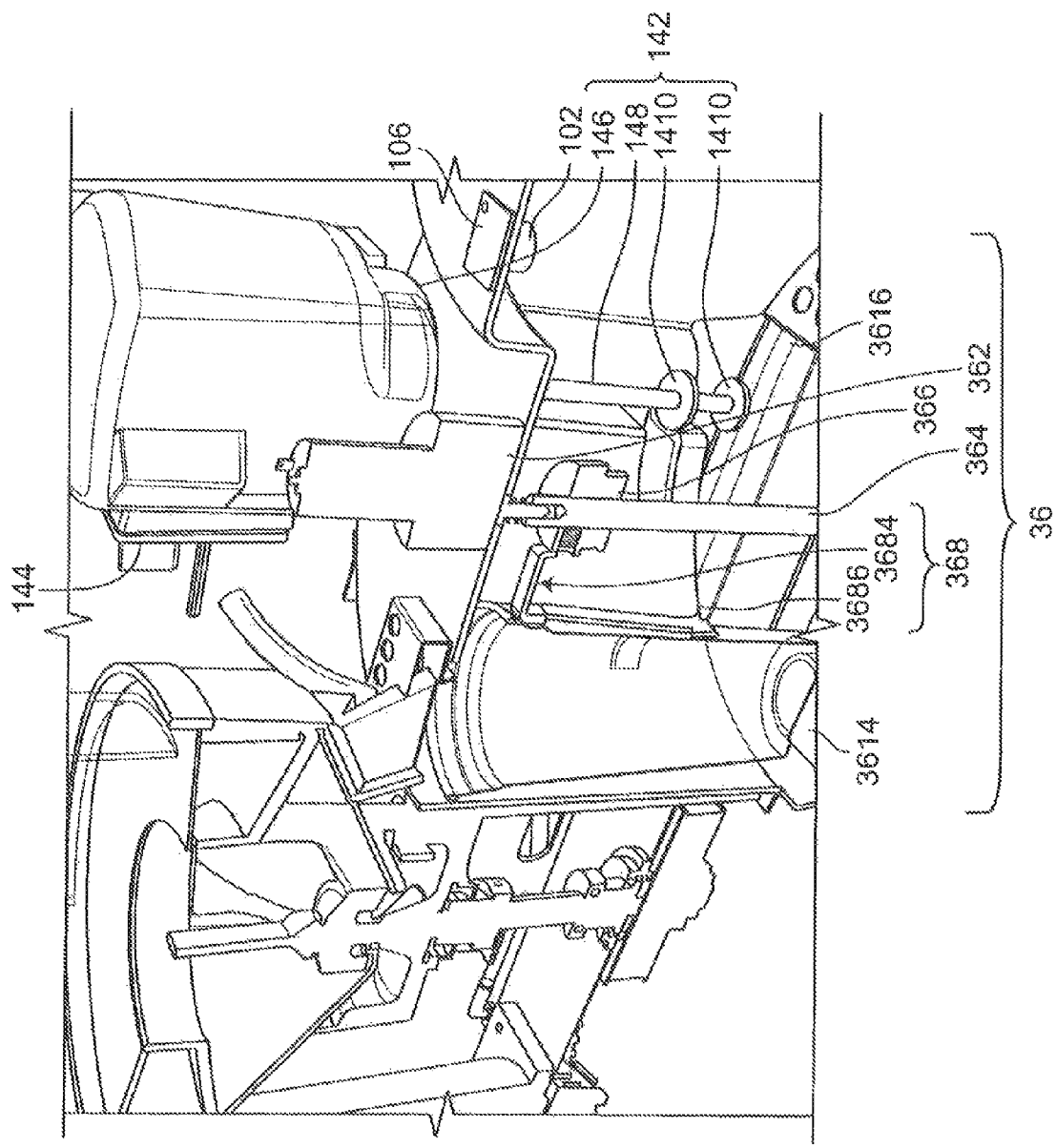
FIG. 7 shows various components of the apparatus of FIG. 1, including components of a mixing unit, a transporting unit and a cup detection unit.
Figure 8:
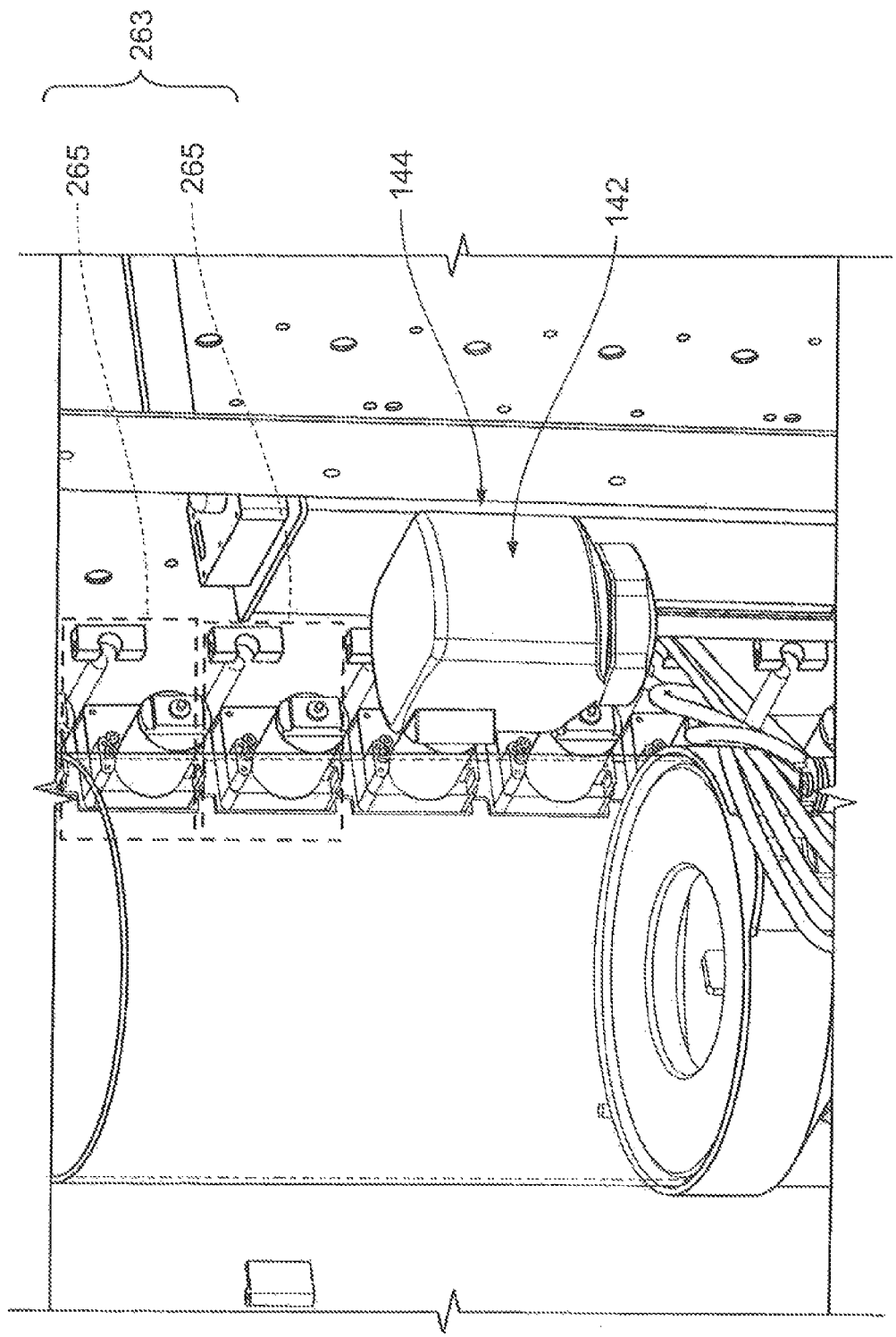
FIG. 8 shows various components of the apparatus of FIG. 1, including components of the mixing unit and the flavor dispensing unit.
Figure 9:
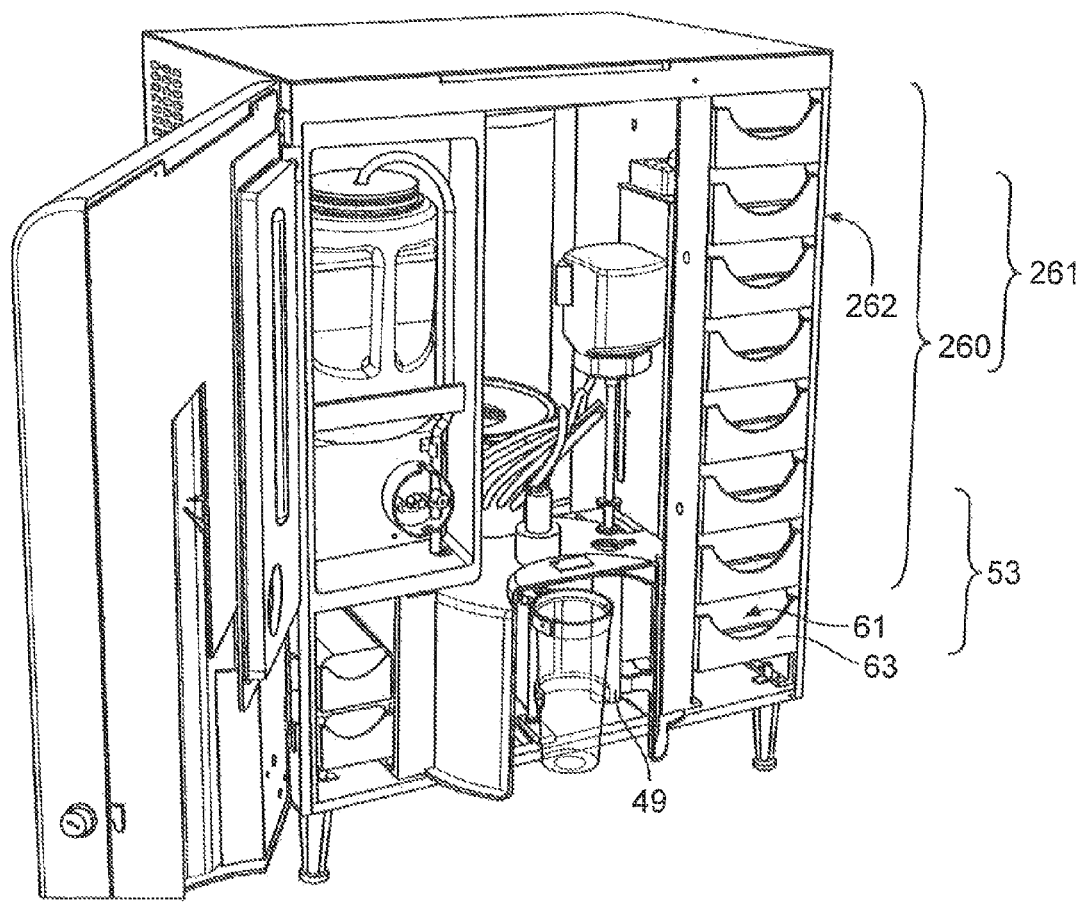
FIG. 9 shows various components of the apparatus of FIG. 1, including components of a sanitizing unit and the flavor dispensing unit.
Figure 10:
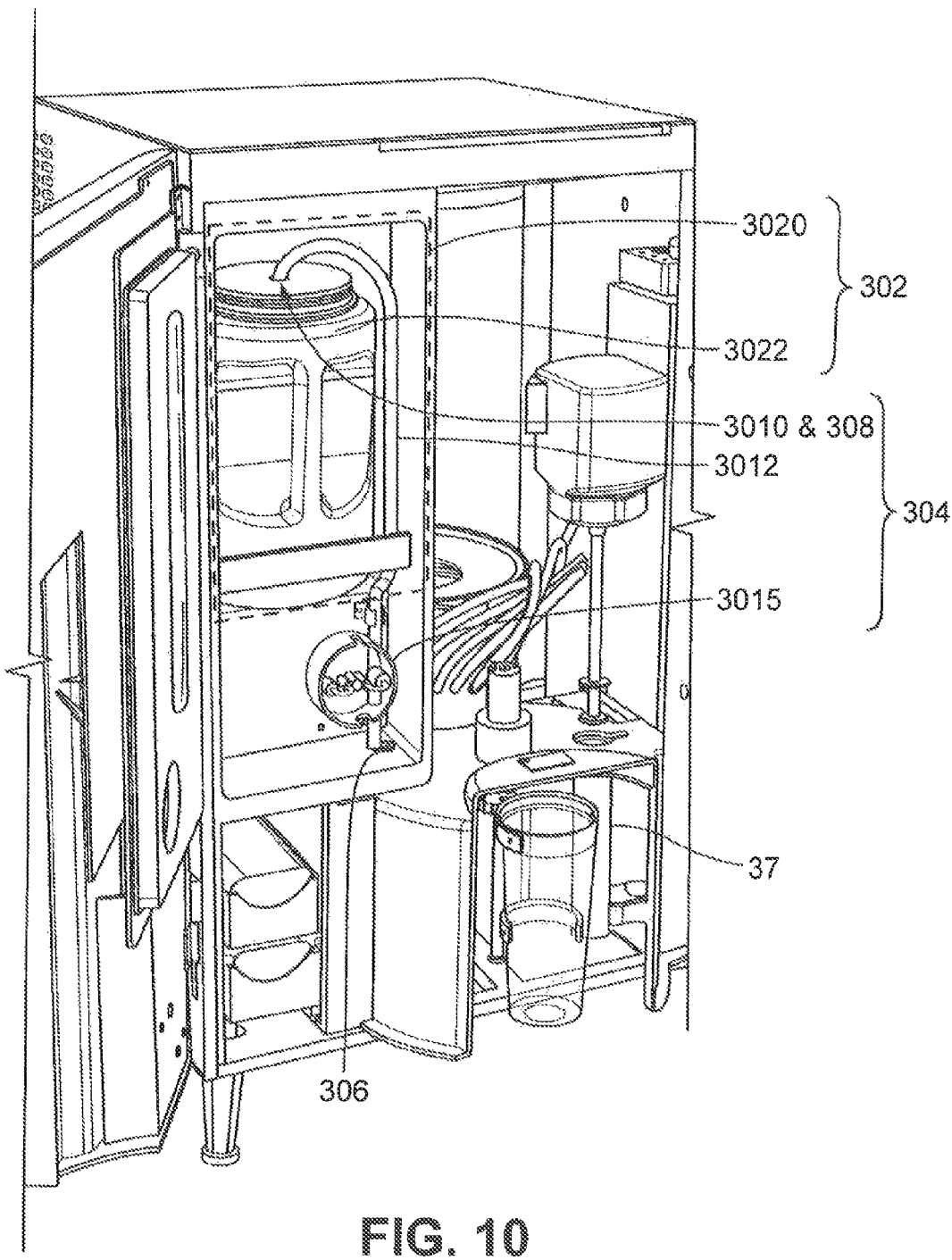
FIG. 10 shows various components of the apparatus of FIG. 1, including components of the milk product dispensing unit and the sanitizing unit.
Figure 11:
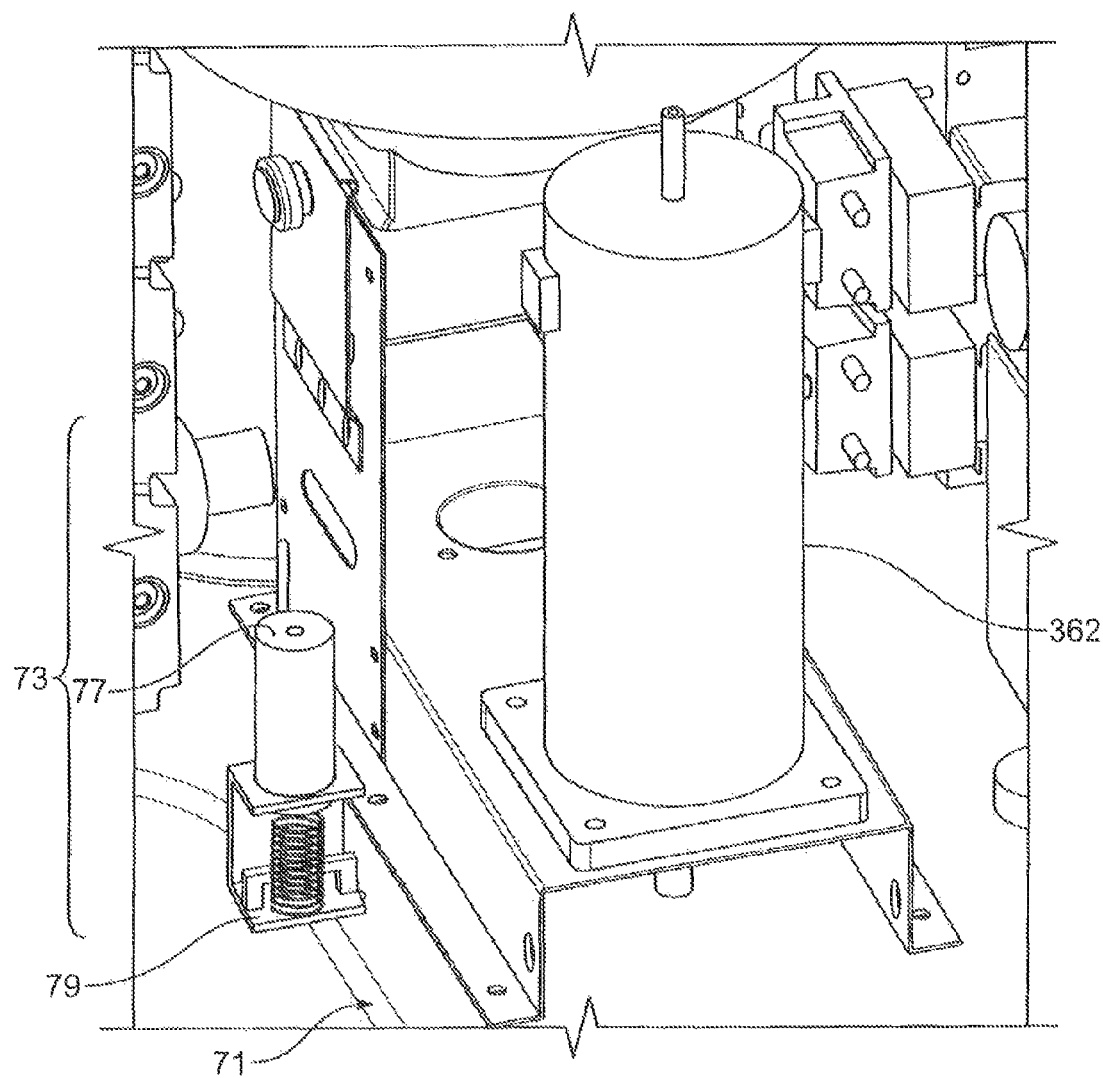
FIG. 11 shows components of the sanitizing unit.

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

FIGS. 1 to 11 show a beverage production apparatus 10 for producing beverages in accordance with an embodiment of the invention. In particular, as further discussed below, the beverage production apparatus 10 can produce frozen beverages that include fragmented ice (e.g., shaved or crushed ice) as one of their ingredients, such as slush beverages and smoothie beverages, hereinafter respectively referred to as "slushies" and "smoothies". Also, in this embodiment, the beverage production apparatus 10 can produce hot beverages that include heated water as one of their ingredients, such as coffee and flavored coffee beverages (e.g., French Vanilla, Mocha, etc.).

The beverage production apparatus 10 comprises a dispensing system 12, a mixing unit 14, and a control unit 16 comprising a user interface 50, which interact to prepare a particular beverage when requested by a user, such as a customer or operator. More particularly, when the control unit 16 receives user input requesting the particular beverage via the user interface 50, it generates control signals to cause the dispensing system 12 to dispense various ingredients (e.g., fragmented ice, water, flavoring ingredients, milk product) that are mixed by the mixing unit 14 in order to prepare the particular beverage, which is served in a cup (i.e., any suitable drinking container). In this embodiment, the beverage production apparatus 10 also comprises a transporting unit 36 for transporting the cup into which the particular beverage is to be served between a plurality of stations at which different beverage preparation operations are performed, including dispensing of ingredients into the cup by the dispensing system 12 and their mixing in the cup by the mixing unit 14. This "one beverage at a time" production is particularly advantageous for production of frozen beverages as it avoids having to prepare and refrigerate a large batch of frozen beverage product.

These and other components of the beverage production apparatus 10, which are further discussed below, are located within a housing 13 such that the beverage production apparatus 10 minimizes its "footprint" in an environment (e.g., a convenience store or fast food/quick serve restaurant) where it is used.

Dispensing System 12

The dispensing system 12 is configured to dispense any of a set of ingredients that can be used to prepare beverages to be produced by the beverage production apparatus 10. These ingredients can take on various forms in various embodiments. In this embodiment, the ingredients that can be dispensed by the dispensing system 12 comprise:

fragmented ice (e.g., shaved or crushed ice);
  water (e.g., non-heated water, heated water);
  flavoring ingredients, each flavoring ingredient being used to provide a main flavor of a beverage to be produced. For example, a flavoring ingredient may be a fruit-flavored ingredient, i.e., an ingredient producing a beverage having a fruity taste (e.g., strawberry, raspberry, orange, mango, banana, pineapple, pomegranate). In another example, a flavoring ingredient may be a coffee-flavored ingredient, i.e., an ingredient producing a beverage having a coffee or coffee-like taste (e.g., espresso, French vanilla, mocha); and
  one or more milk products, each of which can be a natural milk product such as milk or cream, or an artificial milk product that has a taste simulating its natural counterpart. A milk product may be a powder milk product or, in this embodiment, a liquid milk product.

To dispense these ingredients, in this embodiment, the dispensing system 12 comprises an ice supply unit 22, an ice fragmentation unit 24, a flavor dispensing unit 26, a water dispensing unit 28 and a milk product dispensing unit 30.

a) Ice Supply Unit 22

The ice supply unit 22 is configured to supply ice in a quantity sufficient to produce multiple frozen beverages. To that end, the ice supply unit 22 provides storage and temperature maintenance functionality for ice used to produce frozen beverages. In this embodiment, the ice supply unit 22 comprises an ice chamber 220, an ice entry portion 224 defining an ice entry opening, a hinged door 226, and a refrigeration system 228.

The ice chamber 220 is a thermally insulated container defining an interior space that is used to store a given quantity of ice for producing multiple frozen beverages. For example, in this embodiment, the ice chamber 220 is configured to store about 15 lbs (or about 7 kg) of ice in the form of ice cubes. In other embodiments, the ice chamber 220 may be configured to store a greater or smaller quantity of ice, possibly in forms other than ice cubes (e.g., larger blocks or chunks). The quantity of ice that is storable in the ice chamber 220 saves an operator from having to continually refill the beverage production apparatus 10 with ice each time that a frozen beverage is produced.

The ice chamber 220 is bounded by the ice entry portion 224 at a top end and the ice fragmentation unit 24 at a bottom end. Insulating material is provided between exterior and interior surfaces of the ice chamber 220 to maintain the temperature inside the ice chamber 220 to ensure that ice stored therein remains in a solid form that can be used by the ice fragmentation unit 24. The refrigeration system 228 is connected to the ice chamber 220 in order to regulate its temperature and humidity to maintain conditions within the ice chamber 220 that are adequate to keep the ice stored therein from melting.

An ice level sensor (not shown) located on the interior surface of the ice chamber 220 is used to monitor a current level of ice and alert an operator when ice needs to be added to the beverage production apparatus 10. This sensor monitors the ice chamber 220 for the following two conditions:

If the ice level sensor detects that the ice within the ice chamber 220 drops below a predetermined amount, such as if the ice currently in the ice chamber 220 is only sufficient to produce one (1) or two (2) frozen beverages, the ice level sensor sends an "ice-low" signal to the control unit 16. Upon receipt of this signal, the control unit 16 alerts the operator that additional ice needs to be added to the ice chamber 220, such as through a visual or auditory alarm.
  If the ice level sensor detects that the ice chamber 220 is empty (i.e. the ice within the ice chamber 220 is insufficient to produce even one (1) frozen beverage), the ice level sensor sends an "ice-empty" signal to the control unit 16. Upon receipt of this signal, the control unit 16 alerts the operator that additional ice needs to be added to the ice chamber 220 in a manner similar to that mentioned above, but may also prevent customers from choosing beverages that use ice as an ingredient, such as by "locking out" options for such beverages on the user interface 50.

The ice entry portion 224 and the hinged door 226 form one end of the ice chamber 220 which, in this case, is situated at a top of the beverage production apparatus 10 and may thus be integrated into its top surface. Ice is added into the ice chamber 220 via the ice entry opening defined by the ice entry portion 224, with the hinged door 226 that can be manually opened or closed by an operator. The ice entry opening opens into the interior space of the ice chamber 220 to allow the insertion of a sufficient quantity of ice for beverage production. In this case, the ice entry opening defined by the ice entry portion 224 allows insertion of ice cubes into the ice chamber 220 using a conveyance medium, such as a bag, scoop or hopper. The ice entry opening defined by the ice entry portion 224 is covered by the hinged door 226 when it is shut to prevent access to the ice chamber 220.

Like the ice chamber 220, the ice entry portion 224 and the hinged door 226 are constructed using insulating material, which may be the material used for the ice chamber 220 or a different material. The hinged door 226 can be placed in one of two (2) positions (open or closed) to allow or prevent access to the ice entry opening leading to the interior space of the ice chamber 220 and also contains a door sensor (not shown) to report its position. When an operator needs to add ice to the ice chamber 220, he/she moves the hinged door 226 to its open position, exposing the ice entry opening defined by the ice entry portion 224 that leads to the ice chamber 220. At this point, the door sensor sends a "door open" signal to the control unit 16 to indicate the position of the hinged door 226. Upon receipt of this signal, the control unit 16 prevents production of beverages that use ice as an ingredient, such as by "locking out" options for such beverages on the user interface 50, in order to allow the operator to add the ice safely.

Once a sufficient amount of ice has been added to the ice chamber 220 through the office entry opening of the ice entry portion 224, the operator moves the hinged door 226 to its closed position. When the hinged door 226 is in this position, the ice entry portion 224 seals the ice chamber 220 off from the outside, insulating the ice contained within against heat sources outside of the ice chamber 220. At the same time, the door sensor terminates the "door open" signal to indicate that the hinged door 226 is now closed and that the ice chamber 220 is sealed. Upon receipt of this signal, the control unit 16 allows production of beverages that use ice as an ingredient again.

The size of the ice entry opening in the ice entry portion 224 is generally sufficient to allow the addition of a given quantity of ice cubes to the ice chamber 220. In cases where premade ice cubes are used, it is conceivable that an operator may need to first transfer these cubes from an external apparatus where they were created (such as a refrigerator or ice making machine) and load these to the ice chamber 220 using a conveyance medium such as a bag, scoop or tray. In such cases, the conveyance medium may not correspond to the size or shape of the ice entry opening defined by the ice entry portion 224. This difference may lead to spillage of ice cubes onto the beverage production apparatus 10 and/or on a surrounding counter or floor. Besides the time required to clean up this type of spillage, ice cubes that fail from the beverage production apparatus 10 onto a floor also present a safety hazard to both operators and customers, who may slip and fall on them. To prevent such frustrations and reduce such hazards as much as possible, the ice entry portion 224 may be configured to accommodate a hopper (not shown) that can either be temporarily or permanently affixed. For example, such a hopper may be a funnel that narrows to fit the ice entry opening within the ice entry portion 224. Through such a construction, the hopper can provide a larger area for loading ice cubes from unwieldy conveyance media, such as large bags or scoops of ice. In addition, the hopper can allow the operator an easier way to funnel large amounts of ice through the ice entry opening leading to the ice chamber 220. In cases where the hopper is attached temporarily to the ice entry portion 224, the hinged door 226 is opened before the hopper is attached and is then shut after it is detached, whereas in cases where the hopper is attached permanently to the ice entry portion 224, the hopper may simply become an extension of the ice entry opening to the ice chamber 220 and the hinged door 226 may be integrated within the hopper.

In this embodiment, a shower unit 98 is provided to perform certain sanitation and maintenance functions, such as performing a regular cleaning of the ice chamber 220 as well as clearing ice jams from the ice fragmentation unit 24, which can save an operator time and improve efficiency of the beverage production apparatus 10. More particularly, in this embodiment, the shower unit 98 comprises a spray head 2262 integrated with the hinged door 226 and a spray line-in 2264 that connects the spray head 2262 with certain components of the water dispensing unit 28 and a sanitizing unit 37 that will be covered later.

Operation of the spray head 2262 and the spray line-in 2264 in sanitizing the interior space of the ice chamber 220 will now be presented. For example, this operation can be scheduled by the control unit 16 to occur on a regular basis during time periods where it is known that the beverage production apparatus 10 will be rarely used or will be unused, such as during closing hours. At the start of this time period, the control unit 16 sends "chamber clean" signals to the user interface 50, the ice fragmentation unit 24, the water dispensing unit 28 and the sanitizing unit 37. These signals prepare the beverage production apparatus 10 for sanitization of the ice chamber 220 by doing the following:

the water dispensing unit 28 and the sanitizing unit 37 set certain valves to a position that allows flow of hot water and a sanitizing agent from their respective units to flow into the spray line-in 2264;

the ice fragmentation unit 24 sets a wastewater valve to an open position that allows output of the sanitization operation to flow to a drain out (not shown) that connects the beverage production apparatus 10 to a main wastewater drain line; and the user interface 50 disables access to all beverage selection and production, such as by "locking out" these options and/or identifying that a sanitation cycle has been started through an indicator on the user interface 50.

With this preparation complete, the control unit 16 then sends a "hot water dispense" signal and a "sanitizing agent dispense" signal" to the water dispensing unit 28 and the sanitizing unit 37 in order for hot water and a sanitizing agent to be dispensed simultaneously and flow into the spray line-in 2264. The sanitizing agent and hot water combine within the spray line-in 2264 to form a cleaning solution that is sprayed into the ice chamber 220 through the spray head 2262 integrated within the hinged door 226. The cleaning solution melts any ice remaining in the ice chamber 220 while also sanitizing the walls of the chamber 220 and certain components of the ice fragmentation unit 24. The resulting mixture of water from melting ice and the sprayed cleaning solution is drawn downward by gravity to the open wastewater valve (not shown) in the ice fragmentation unit 24, which connects it to a main wastewater drain line where it may flow out of the beverage production apparatus 10.

Under control of the control unit 16, the water dispensing unit 28 and the sanitizing unit 37 continue to dispense hot water and the sanitizing agent for a predetermined period sufficient to melt all of the ice and sanitize the interior space of the ice chamber 220. When this period is over, the control unit 16 stops the flow of sanitizing agent and hot water to the ice chamber 220 through the spray head 2262. At this point, the control unit 16 resets the water dispensing unit 28, the sanitizing unit 37 and the ice fragmentation unit 24 to restore them to their normal operations that will be described later. In addition, the control unit 16 re-enables access to beverage selection via the user interface 50. However, because the ice chamber 220 contains no ice, access to beverages that use ice as an ingredient are disabled until a fresh supply of ice is added to the ice chamber 220 by the operator.

Figure 12:
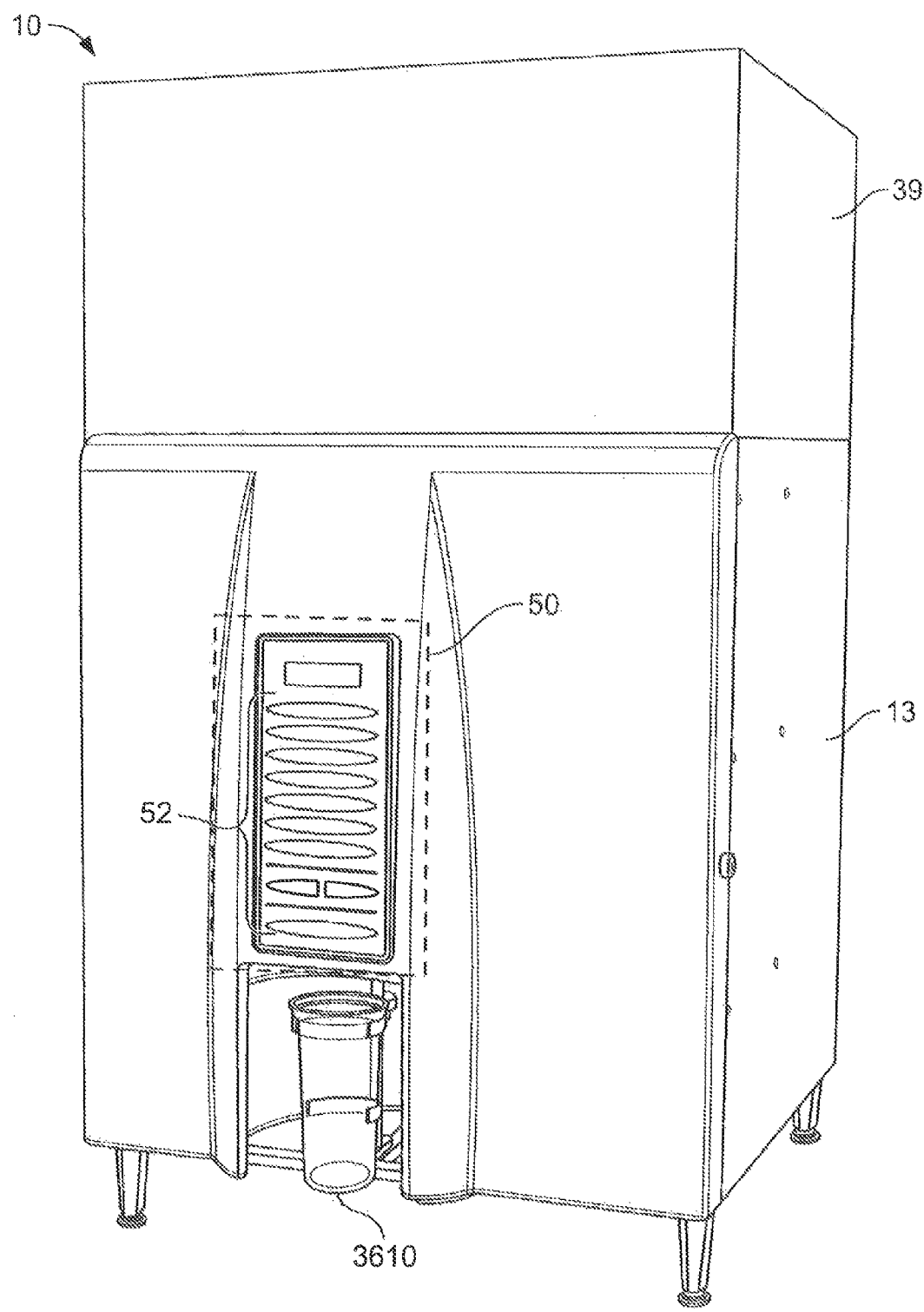
FIG. 12 shows the apparatus of FIG. 1, comprising an ice maker in accordance with another embodiment of the invention.

In the embodiment described above, an operator is responsible for loading a sufficient quantity of ice for beverage production into the ice chamber 220 via the ice entry opening of the ice entry portion 224 using a conveyance medium, such as a bag or scoop. In an alternative embodiment, as shown in FIG. 12, the ice supply unit 22 may comprise an ice maker 39 for making ice that is fed to the ice chamber 220. The ice maker 39 may make ice at a rate supplying a quantity of ice sufficient to produce multiple frozen beverages. For example, in some cases, the ice maker 39 may be configured to make ice at a rate of about 300 lbs (136 kg) of ice per day (24 h). In other cases, the ice making rate of the ice maker 39 may take on other values. The ice maker 39 uses the ice entry opening defined by the ice entry portion 224 to transfer ice that it makes to the ice chamber 220.

The ice maker 39 is configured to make ice using water from a water line, which may be shared with other units of the beverage production apparatus 10 (such as the water dispensing unit 28) or may be solely dedicated to the ice maker 39. Similarly, the ice maker 39 may be connected to power line that can be either shared with other units of the apparatus 10 or dedicated to the ice maker 39 alone. In addition, the ice maker 39 is connected to the control unit 16 via dedicated wiring such that the control unit 16 is aware of the ice maker's presence and oversees its operation, where necessary. Various processes may be implemented by the ice maker 39 to generate ice (e.g., various off-the-shelf ice making devices may be used for the ice maker 39). As these processes are well understood by those skilled in the art, they will not be described further here.

With the ice maker 39, the ice supply unit 22 is now used to both make and store ice. This can save time and money for an operator that would have been otherwise spent refilling the ice chamber 220 when it runs out of ice or after the sanitation procedure described previously. Moreover, replacing the hinged door 226 with the ice maker 39 provides the following additional benefits to an operator:

because the ice maker 39 uses the ice entry opening of the ice entry portion 224, the chances for the spillage of ice cubes outside of the beverage production apparatus that could pose a potential safety hazard to operators and/or customers is eliminated; and because the hinged door 226 to the ice chamber 220 is replaced by the ice maker and because the temperature of the ice maker 39 is likely similar to that of the ice chamber 220, the overall temperature and humidity levels in the ice chamber 220 can be better regulated by the refrigeration system 228, which may extend its operational life as it does not need to work as hard to regulate the temperature within the ice chamber 220.

b) Ice Fragmentation Unit 24

The ice fragmentation unit 24 is configured to fragment a portion of the ice supplied by the ice supply unit 22 to produce fragmented ice.

More particularly, in this embodiment, ice stored within the ice supply unit 22 is typically provided in the form of ice cubes. However, ice to be used as an ingredient in frozen beverages generally needs to be in the form of fragmented ice (i.e., small ice fragments) to allow for a more thorough mixing of beverage ingredients and proper beverage consistencies. As a result, there is a need to convert the ice cubes stored in the ice supply unit 22 into fragmented ice, such as shaved or crushed ice. While in this example, it will be assumed that the ice in the ice supply unit 22 is in the form of ice cubes manually added into the ice supply unit 22, in other examples, this ice can be in various other forms, such as one or more larger blocks or chunks of ice manually added or optionally produced by the ice maker 39, if available.

Thus, the ice fragmentation unit 24 converts ice cubes stored in the ice supply unit 22 into fragmented ice suitable for beverages that use ice as an ingredient. More specifically, in this embodiment, the ice fragmentation unit 24 is configured to shave ice from the ice supply unit 22 to produce shaved ice. To that end, the ice fragmentation unit 24 comprises:

an ice transfer system 242 that allows the proper transfer of ice from the ice supply unit 22 to the other components in the ice fragmentation system 24;

an ice propulsion system 244 that imparts motion to the ice so it can be successfully shaved; and an ice shaver 46 that shaves the ice to produce shaved ice.

The ice transfer system 242 provides an entry point for ice cubes stored in the ice chamber 220 to the ice fragmentation unit 24, and specifically to the ice propulsion system 244 and the ice shaver 246. The ice transfer system 24 is comprised of an upper ice shelf 2422 and a lower ice shaver bowl 2424. The ice shelf 2422 forms the bottom surface of the ice chamber 220 such that it conforms to the general shape of the chamber 220. The shelf 2422 contains a central void that leads to the remaining components of the ice fragmentation unit 24. When ice cubes are added to the ice chamber 220, they collect on (and are supported by) the surface of the ice shelf 2422 that surrounds its central void. As more ice is added to the chamber 220, however, some ice falls through the central void of the ice shelf 2422 into the ice shaver bowl 2424. Ice cubes continue to accumulate in the ice shaver bowl 2424 until they are at the same level as those on the ice shelf, thus allowing the shelf 2422 and the bowl 2424 to jointly support the supply of ice within ice chamber 220.

During the normal operation of the ice fragmentation unit 24, ice cubes contained within the ice shaver bowl 2424 are converted from their cubed form to shaved ice. As the ice cubes contained within in the bowl 2424 are gradually converted to shaved ice, other ice cubes are guided into the bowl 2424 by the shape of the ice shelf 2422, under the force of gravity. This allows the ice transfer system 242 to provide a continuous supply of ice cubes from the ice chamber 220 to the ice fragmentation unit 24. In addition, by supporting most of the ice within the ice chamber 220, the ice shelf 2422 removes weight and stress from the other components of the ice fragmentation unit 24, allowing them to operate more freely and extending their operational lifespan.

The ice propulsion system 244 provides a motive force and mechanism to impart forward motion to the ice cubes contained within the ice shaver bowl 2424 to facilitate their fragmentation. The ice propulsion system 242 comprises a propulsion motor and drive 2442, a shaft 2444, an impellor 2446 and an impellor cap 2448.

The propulsion motor and drive 2442 are used to generate the motive force used by the propulsion system to drive, and subsequently fragment, the ice cubes supplied by the ice transfer system 242. When the propulsion motor and drive 2442 are activated, the motor of this component generates rotational force that is transmitted through the drive mechanism of this component to the shaft 2444, which subsequently rotates in the same general direction. In this way, motive force can be transmitted to the impellor 2446.

The impellor 2446 is a hollow cylindrical tube that comprises a top portion with a central void, a central hub and a plurality of arms that connect the central hub to the top portion. The impellor 2446 sits between the ice shelf 2422 and the ice shaver bowl 2424 of the ice transfer system 242. The top portion of the impellor 2446 contains a central void that conforms to the same general shape as the central void of the ice shelf 2422. However, the outside edge of the central void for the impellor 2446 has a raised lip whose diameter is slightly smaller than that of the void within the ice shelf 2422. As a result, the raised lip surrounding the impellor's 2446 central void fits within the central void of the ice shelf 2422 and so further guides ice cubes from the ice chamber 220 and shelf 2422 down into the ice shaver bowl 2424, as well as to the other components of the impellor 2446.

The top portion of the impellor 2446 is connected to its central hub through the plurality of arms. The arms are designed in such a way that they follow the general shape and contour of the ice shaver bowl 2424. When the impellor 2446 is at rest, the arms allow ice that has fallen through the central void of its top portion to reach the bowl 2424. When the impellor is in motion, however, the arms sweep the ice cubes within the ice shaver bowl 2424 ahead of them, thus propelling them forward.

The central hub of the impellor 2446 provides a connection point between it and the shaft 2444. The hub is centrally pierced to allow exposure of part of the shaft 2444 that is threaded and to which threads on the impellor cap 2448 correspond. When the impellor cap 2448 is suitably attached to the shaft 2444, the motive force provided by the propulsion motor and drive 2442 and transmitted via the shaft 2444 rotates the impellor 2446 in the same direction. However, the impellor cap 2448 can also be detached by unscrewing it from the shaft 2444, thus allowing the removal of the impellor 2446 from the ice propulsion system 244. This allows an operator to inspect and clean the impellor 2446 when necessary.

When the ice propulsion system 244 is activated, ice cubes within the ice shaver bowl 2424 are swept around by the impellor 2446. The ice shaver 246 provides forces by which the ice cubes are converted to shaved ice through removal of small shavings from an ice cube until the entire cube has been converted into such shavings.

More particularly, in this embodiment, the ice shaver 246 comprises a shaver blade 2462, a shaver guide 2464 and an ingredient chute 267. The shaving blade 2462 has a cutting edge that is suitably integrated into the ice shaver bowl 2424 such that ice cubes that are spun around the bowl 2424 by the impellor 2446 regularly come into contact with the cutting edge of the blade 2462. The cutting edge of the blade 2462 is designed and oriented within the ice shaving bowl 2424 in such a way to allow shaving of ice cubes that come into contact with it. The shaving blade 2462 can be made of any suitable material, such as stainless steel. A protective device may be provided to prevent an operator performing normal cleaning and/or maintenance activities from coming into contact with the cutting edge of the shaver blade 2462.

The ice shaver guide 2464 is used to direct the ice shavings produced by the shaving blade 2462 into the ingredient chute 267.

The ingredient chute 267 is used to convey the shaved ice from the ice shaver guide 2464 to be dispensed into the cup used to prepare the beverage. The ingredient chute 267 comprises a hollow, vertically-oriented cylinder with the assembly of the ice shaver bowl 2424/shaving blade 2462/ice shaver guide 2464 at its upper end. The side of the ingredient chute 267 has a plurality of inlet ports 2671 that are connected to components of the flavor dispensing unit 26 and the water dispensing unit 28. These inlet ports 2671 allow flavoring ingredients and/or water to flow into the chute 267. Because the ingredient chute 267 is vertically-oriented, its lower end is left open so that gravity may cause beverage components (including ice shavings, water and/or flavoring ingredients) entering the chute 267 to fall into the waiting cup below. This design ensures that beverages receive the maximum amount of required ice, water and flavoring ingredient(s).

An example of the operation of the ice fragmentation unit 24 will now be presented. In this example, assume that a customer has initiated the production of a slushie, which uses shaved ice as an ingredient.

Before beverage production begins, a certain quantity of ice cubes already occupy the ice shaving bowl 2424, while the main weight of ice within the ice chamber 220 is supported by the ice shelf 2422. Because the ice is currently at rest, the control unit 16 can use the sensor within the ice chamber 220 to detect the presence of ice within the ice supply unit 22 and allow the production of the slushie to begin.

Once the control unit 16 determines enough ice exists within the ice chamber 220 to produce the beverage, it sends an "ice dispense" signal to the ice fragmentation unit 24. Upon receipt of this signal, the propulsion motor and drive 2442 are activated, which in turn rotates the shaft 2444 and the impellor 2446 connected via the impellor cap 2448.

Ice cubes currently within the ice shaver bowl 2424 are propelled forward by the rotating arms of the impellor 2446 and come into repeated contact with the shaver blade 2462. Repeated contact with the cutting edge of the blade 2462 causes an ice cube to be shaved into successively smaller shavings until the entire cube has been converted to fragments. As the ice cubes contained within the ice shaver bowl 2424 are converted to shavings, a void is created with the bowl 2424. However, the rotation of the top portion of the impellor 2446 (along with the general design of the ice shelf 2422 and the weight of the ice within the ice chamber 220) cause ice cubes to fall from the chamber 220 through the voids in the ice shelf 2422 and the impellor 2446 into the ice shaver bowl 2424, where they are subsequently converted into ice shavings.

Because generation of ice shavings occurs at some speed, they contain some initial momentum, which allows them to be guided by the ice shaver guide 2464 into the ingredient chute 267. Once in the ingredient chute 267, the ice shavings flow downwards towards the cup at its bottom. During the operation of the ice fragmentation unit 24, components of the flavor dispensing unit 26 have also dispensed a given quantity of one or more flavoring ingredients into the chute 267 through the inlet ports 2671. Through gravity, the ice shavings and the one or more flavoring ingredients flow through the ingredient chute 267 and into the cup where they are mixed and in which the slushie will be prepared.

When the control unit 16 determines that the ice fragmentation unit 24 has been activated for a duration sufficient to generate the amount of shaved ice needed for the beverage, it causes deactivation of the propulsion motor and drive 2442, which stops the rotation of the shaft 2444 and the attached impellor 2446. However, ice within the ice chamber 220 continues to fall through the central void of the ice shelf 2422 and into ice shaver bowl 2424 until a new equilibrium is established that supports the remaining ice in the chamber 220. In some cases, the apparatus 10 may comprise a fragmented ice sensor (not shown) for sensing a quantity (e.g., a level) of shaved ice dispensed into the cup and send a signal indicative of this quantity to the control unit 16 to allow the unit 16 detect when sufficient shaved ice has been dispensed for the beverage type and size.

It is possible that at some point during the operation of the ice fragmentation unit 24 described above, an ice jam could occur that would prevent its further operation. Such an ice jam may be caused by water or ice that prevents the ice fragmentation unit 24 from being able to convert ice cubes into shaved ice. Ice jams could be caused by water re-freezing around a moving component of the ice fragmentation unit 24 (such as the impellor 2446) or an excess amount of ice falling into the ice shaver bowl 2422 that prevents the ice propulsion 244 or the ice fragmentation system 246 from operating.

If an ice jam occurs, the ice fragmentation unit 24 makes repeated attempts to clear the jam by stopping and then restarting the ice propulsion system 244, under control of the control unit 16. However, when the number of attempts passes a predetermined threshold, the control unit 16 prepares to perform a procedure to clear the ice jam and allow the resumption of normal operations by doing the following:

returning the cup in which the beverage was being prepared to the customer;

disabling all beverage production options on the user interface 50 to prevent any beverage production from being initiated during the ice jam clearance procedure; and setting the wastewater valve (not shown) in the unit 24 to the open position so that water and/or melted ice flows into a drainage line for the beverage production apparatus 10.

With these preparations complete, the control unit 16 sends a "jam clear" signal to the water dispensing unit 28 to cause a certain valve to be activated that allows heated water produced by this unit to flow into the spray line-in 2264 that is connected to the spray head 2262. The control unit 16 then sends a "hot water dispense" signal that causes the water dispensing unit 28 to allow heated water to flow through the spray line-in 2264 and get sprayed onto the ice in the ice chamber 220 via the spray head 2262 within the hinged door 226. The control unit 16 causes heated water to be sprayed for a duration known to be sufficient to melt all ice within the ice chamber 220, as well as ice within the components of the ice fragmentation unit 24, such as the ice shaver bowl 2422 or around the impellor 2446.

The water sprayed into the ice chamber 220, along with water generated by the melted ice, flows to the wastewater value (not shown) for the unit 24. However, because this valve was set to the open position previously, this water flows to the drainage for the beverage production apparatus 10 and into the main wastewater drain line.

The ice jam is cleared when all of the ice within the ice supply unit 22 and ice fragmentation unit 24 has been melted. At this point, the control unit 16 re-enables beverage production and closes the wastewater valve for the unit 24. However, because there is no ice left in the beverage production apparatus 10, the control unit 16 disables access to beverages that use ice as an ingredient and also alerts the operator (such as through a visual or auditory alert) that a fresh supply of ice must be added to the ice chamber 220. In embodiments where the ice maker 39 is provided, however, the control unit 16 automatically initiates its operation to supply the needed ice rather than alerting the operator.

The beverage production apparatus 10 is thus able to clear ice jams independently without external intervention. This saves an operator the time that he/she would have otherwise have spent trying to clear the jam, as well as protects an operator from coming into contact with internal components of the apparatus 10 that could harm or endanger an operator during such an attempt.

While in this embodiment, the ice fragmentation unit 24 is configured to fragment ice from the ice supply unit 22 by shaving it, in other embodiments, the ice fragmentation unit 24 may fragment this ice in other manners. For example, in one embodiment, the ice fragmentation unit 24 may comprise an ice crusher for crushing a portion of the ice stored in the ice supply unit 22 to produced crushed ice, rather than shaved ice.

c) Flavor Dispensing Unit 26

The flavor dispensing unit 26 is configured to store a plurality of supplies of flavoring ingredients and to dispense any combination of these flavoring ingredients in order to produce beverages. As mentioned above, each flavoring ingredient can be used to provide a main flavor of a beverage to be produced. For example, a flavoring ingredient may be a fruit-flavored ingredient (e.g., strawberry, raspberry, orange, mango, banana, pineapple, pomegranate), or it may be a coffee-flavored ingredient (e.g., espresso, French vanilla, mocha).

More particularly, a beverage that contains only shaved ice, water and/or milk product as its ingredients generally provides very little (if any) flavor and would likely be unappetizing to a typical consumer. As a result, beverages typically contain natural and/or artificial flavoring ingredients that provide some particular flavor(s) desired by the customer, such as cherry, strawberry, chocolate or coffee flavor. Moreover, customers typically want as much choice as possible in terms of flavoring their beverages and may prefer beverages with unique combinations of flavors that appeal to them alone. Thus, there is a need to provide choices for, as well as a method to dispense, particular desired flavorings to a beverage.

To accommodate this need, the flavor dispensing unit 26 provides a plurality of flavoring ingredients that can be added individually or in combination to a beverage and appeal to customer's individual taste. Flavoring ingredients that can be made available may include those based on fruits (e.g., mango, banana or strawberry flavors), types of coffee (e.g., espresso, cappuccino or mocha flavors), as well as other flavors, such as chocolate or vanilla.

In addition, certain customers may also want to add ancillary ingredients (e.g., energy enhancers, vitamins and/or other nutritional supplements) to their beverage to gain certain nutritional, energetic or other benefits, such as adding extra caffeine or ginseng to a beverage for a temporary increase in energy and attention. While the addition of ancillary ingredients to beverages is not covered by the flavor dispensing unit 26, a unit with components and functionality similar to that of the flavor dispensing unit 26 may be provided to add these ingredients to a beverage.

In this embodiment, the flavor dispensing unit 26 comprises a flavor storage area 261 and a flavor transport system 263. The flavor storage area 261 is comprised of a flavor additive compartment 260 that receives a plurality of flavor additive cradles 262. Each cradle 262 holds a supply of a given flavoring ingredient and is designed to slide into or out of a section in the flavor additive compartment 260. The flavor additive compartment 260 aims to provide the widest variety of flavoring ingredients to customers in a minimum of space within the apparatus 10.

Each favor additive cradle 262 comprises two (2) laterally spaced side walls large enough to fit a flavor additive pouch 264 (described below), a bottom wall, a front wall with an entry slot at one end, as well as a rear wall with a slot that can be used as a handle to allow the entry or egress of the cradle 262 from the flavor additive compartment 260. The top of the cradle 262 is open to allow access to the flavor additive pouch 264 contained within.

A given flavoring ingredient is contained within the flavor additive pouch 264, that lies within the favor additive cradle 262. The flavor additive pouch 264 may comprise a sterile flexible plastic container that can vary in size and volume and that contains a certain quantity (e.g., 2 L or more or less) of the given flavoring ingredient in a form suitable for dispensing, such as a liquid or syrup. Flavor additive pouches 264 are filled with an individual flavoring ingredients and are then sealed for transport and/or storage until needed. Sealing the flavor additive pouch 264 prevents external contaminants (such as oxygen and/or bacteria) from entering the pouch and affecting the flavor of the ingredient.

The flavor additive pouch 264 also contains a female fitment 268 that extends from the interior of the pouch out through its exterior. The female fitment 268 comprises:

an interior cavity 2612 that allows access to the favor additive contained within the pouch 264 during use;

a seal (not shown) within the interior cavity 2612 that prevents the entry of external contaminants to the flavor additive pouch 264 during transport and storage, as well as reuse of the pouch 264; and a ridged collar 266 at the exterior end of the fitment 268 that allows the correct placement of the pouch 264 within the flavor additive cradle 262 before use.

The exterior end of the female fitment 268 is surrounded by the ridged collar 266 that is dimensioned to fit within and remain engaged by the entry slot of the flavor additive cradle 262. Since only one entry slot capable of accommodating the collar 266 exists in the flavor additive cradle 262, an operator is able to consistently position the flavor additive pouch 264 correctly within the cradle 262, as well as quickly replace an empty pouch within the flavor dispense unit 26.

The flavor transport system 263 allows the delivery of a given quantity of each of one or more of the flavoring ingredients stored in the flavor storage area 261 to a beverage to produce a desired flavor. The flavor transport system 263 comprises a set of flavor additive transport units 265, each of which may be connected to a flavor additive pouch 264 to serve as a flavor dispenser for dispensing the flavoring ingredient contained within that pouch. Since in this case each additive transport unit 265 is designed to carry a single flavoring ingredient, there is an equivalent number of additive transport units 265 to flavor additive cradles 262 within the beverage production apparatus 10.

All flavor additive transport units 265 terminate at the inlet ports 2671 of the previously described ingredient chute 267, which is where one or more flavoring ingredients are combined with output from the ice fragmentation unit 24 and/or the water dispensing unit 28 within the cup for production of the beverage.

Each flavor additive transport unit 265 comprises:
A male fitment 2651 that is dimensioned to fit within the female fitment 268 of the flavor additive pouch 264;
A sensor 2653 to monitor the level of flavoring ingredient remaining within the flavor additive pouch 264;
A vacuum switch 2655 to identify the condition when the flavor additive pouch 264 is empty;
A check valve 2656 to maintain the air-tightness of the connection;
A pump 2658 (such as a peristaltic pump) used to move the flavoring ingredient through the unit 265;
An adjustable valve 2657 to allow the adjustment of the additive flow through the unit 265; and
An additive line 2659 that acts to connect the components 2651, 2653, 2655, and 2657 to each other, as well as to the aforementioned ingredient chute 267.

The flavor additive pouch 264 and the additive transport system 265 are designed to be interconnected and represent the connection point between the flavor storage area 261 and the flavor transport system 263. As stated previously, the ridged collar 266 of the flavor additive pouch 264 is dimensioned to fit inside of, and be engaged by, the entry slot of the flavor additive cradle 262 upon entry to ensure a consistent fit. Thus, when the flavor additive cradle 262 is positioned for reinsertion to the flavor additive compartment 260, the center of the ridged collar 262 (representing the end of the exterior portion of the female fitment 268) has to be in-line with the male fitment 2651 of the additive transport system 265 in order for the system 265 to be able to draw the flavor ingredient from the pouch 264 when needed.

As beverages are produced by the beverage production apparatus 10, a certain amount of flavoring ingredient within a flavor additive pouch 264 is drawn out and the total amount of ingredient left within the pouch 264 diminishes. The quantity of flavoring ingredient left within a given pouch is monitored by components of the additive transport system 265, namely the vacuum switch 2655 and/or the sensor 2653.

The vacuum switch 2655 is used to identify when a vacuum exists within the flavor additive pouch 264, indicating that it is completely empty. When this situation exists, the switch 2655 sends a "flavor empty" signal to the control unit 16, which then responds to the signal by disabling access to the flavor (or to flavors based on that additive) on the user interface 50 and alerting the operator, such as through a visual or auditory signal.

While the vacuum switch alerts an operator when a flavor additive pouch 264 is completely empty, it can be more advantageous for an operator to know the level of additive remaining within a given pouch beforehand. Having this information available would allow an operator to procure and/or prepare replacements before those flavor ingredients run out.

To address this need, the sensor 2653 is used to assess the current level of flavoring ingredient left within its associated flavor additive pouch 264. The sensor 2653 may use a variety of sensing methods (including infrared sensing methods) to monitor the level of flavoring ingredient in the additive line 2659 and so determine the level of flavoring ingredient remaining within its associated pouch. The sensor 2653 is also equipped to compare the quantity of flavoring ingredient currently left in a given pouch against a set of preset levels and report those findings to the control unit 16 via defined signals. For example, the sensor 2653 could be configured to send a signal when the level of flavor ingredient within a flavor additive pouch decreases below 10% of its capacity. Alternatively, the control unit 16 may monitor signals from the sensor 2653 and detect, based on these signals, when the quantity of flavoring ingredient in the flavor additive pouch 264 falls below a given threshold. This allows the control unit 16 and/or operator to monitor the level of flavoring ingredient remaining at any given time.

Through these components, an operator of the beverage production apparatus 10 may monitor the state of the flavor additive pouches 264 within the flavor dispensing unit 26 without needing to open it. In addition, the apparatus 10 can alert the operator when the level of flavor ingredient within a given flavor additive pouch decreases beyond a certain point where procurement of a replacement is advisable, as well as when a pouch is completely empty and needs to be replaced.

When the control unit 16 becomes aware that a certain instance of the flavor additive pouch 264 is empty, it alerts the operator through a visual or auditory signal, as well as disables access to any beverage flavors that uses the flavor additive in whole or in part until the pouch 264 is replaced. To replace the flavor additive pouch 264, the operator first opens a front panel of beverage production apparatus 10 to access the flavor additive compartment 260. Upon identifying the flavor additive cradle 262 containing the empty pouch, the operator uses the handle-slot on the rear wall of the cradle 262 to extract the cradle 262 from the compartment 260. This action also disconnects the female fitment 268 of the flavor additive pouch 264 from the associated male fitment 2651 of the additive transport system 265.

The operator removes the empty flavor additive pouch 264 from its flavor additive cradle 262 and replaces it with a new instance of the flavor additive pouch 264 that contains a full quantity of flavoring ingredient. The new flavor additive pouch 264 is positioned within the cradle 262 by fitting the center of the ridged collar 262 (representing the end of the exterior portion of the female fitment 268) into the front entry slot of the flavor additive cradle 262, which also positions it in-line with the male fitment 2651 of the additive transport system 265. Once the ridged collar of the flavor additive pouch 264 is firmly engaged by the entry slot of the flavor additive cradle 262 (and the rest of the pouch 264 containing the flavor additive is seated), the cradle 262 is re-inserted into its slot in the flavor additive compartment 260 using the same handle-slot on the rear wall of the flavor additive cradle 262 that was used to previously extract it. Reinsertion of the flavor additive cradle 262 by the operator into a slot within the flavor additive compartment 260 threes the male fitment 2651 into the interior cavity 2612 of the female fitment 268, breaking the seal 2612 that had previously prevented access to the flavor additive via the interior cavity 2612. As a result, the components additive transport system 265 gains access to the quantity of flavoring ingredient contained within the full flavor additive pouch 264.

Once the full flavor additive pouch 264 is connected to the additive transport system 265, the sensor 2653 senses that a sufficient quantity of the flavor ingredient is now present and sends a signal to the control unit 16 to indicate this. Upon receipt of this signal, the control unit 16 re-enables access to any previously blocked beverage types or flavors that uses the flavoring ingredient. At no point during this process was access to, or production of, beverages that used other flavoring ingredient prevented. In this way, the beverage production apparatus 10 continues to provide as many beverage options to customers as possible while providing time for an operator to refill the flavoring ingredient.

In addition to sensing the remaining quantity of flavoring ingredient for a given flavor additive pouch 264, in this embodiment, the sensor 2653 in the additive transport system 265 can also identity the actual flavoring ingredient (e.g., strawberry, mango, etc.) contained within a new flavor additive pouch 264. In particular, when the operator connects a new flavor additive pouch 264 to the components of the additive transport system 265, a switch contacted by the insertion of the new pouch 264 to the system 265 causes a small quantity (e.g., 1 oz) of the flavoring ingredient in the new pouch 264 to be drawn out. The sensor 2653 uses this quantity to observe characteristics that would identify the actual flavoring ingredient in the new pouch 264.

For example, in some embodiment, the control unit 16 may have access to a database containing characteristics of different flavoring ingredients. When the new pouch is inserted to the additive transport system 264, the sensor 2653 may send a "flavor reading" signal to the control unit 16 with a reading of the observed characteristics for the flavor ingredient sensed for the new pouch 264. Based on this signal conveying a reading of the sensor 2653, the control unit 16 may compare characteristics extracted from this signal to the characteristics in the database in an attempt to identity which flavoring ingredient has been sensed. Once the flavor in the new pouch 264 has been identified by matching it to an entry in the database, the control unit 16 knows from which of the pouch(es) 264 a particular flavor ingredient can be drawn when preparing a given beverage that includes this flavor ingredient. This can help avoid situations where the operator replaces an empty pouch by a new pouch having containing the wrong flavoring ingredient.

Each additive line 2659 from each additive transport unit 265 terminates at the ingredient chute 267, through which shaved ice and/or water are supplied to a beverage via by the ice fragmentation unit 24 and/or water dispensing unit 28. The ingredient chute 267 is designed with the inlet ports 2671 that are in equal number to the number of additive transport units 265, and by extension, the number of flavor additive cradles 262, within the flavor dispensing unit 26. Because the ingredient chute 267 is used to dispense the output of both the ice fragmentation unit 24 and the water dispensing unit 28, the flavor ingredients dispensed by each of the inlet ports 2671 may be placed in liquid communication with the shaved ice and/or water in the cup that can used to produce a beverage. This ensures that the maximal amount of each of the desired flavoring ingredients specified by a customer for their beverage is conveyed to the cup being used to server it.

An example of the operation of the flavor dispensing unit 26 will now be presented. In this example, assume that the beverage production apparatus 10 is installed in a convenience store and that a customer wishes to have the apparatus 10 produce a fruit flavored slushie. It is further assumed that the customer has entered their beverage choice via the user interface 50 and inserted a cup for this beverage into the apparatus 10 and that the transport unit 36 has moved the cup to a correct station within the apparatus 10 to receive shaved ice and one or more flavoring ingredients before it is mixed by the mixing unit 14 to produce the beverage.

The control unit 16 first identifies the one or more flavoring ingredients (as well as the associated flavor additive pouch(es) 264 and the additive transport unit(s) 265) required to flavor the beverage in accordance with the customer's choice, in this case for a fruit-flavored slushie (e.g., a strawberry flavored slushie versus a strawberry-mango flavored slushie). The flavoring ingredients required to produce such a beverage may be produced either through the addition of a given quantity of flavoring ingredient from a single flavor additive pouch 264 (i.e. a quantity of a single strawberry-flavored ingredient) or a combination of multiple flavoring ingredients from a plurality of flavor additive pouches (e.g., given quantities of strawberry- and mango flavored ingredients).

Once the control unit 16 has identified all of the required flavor ingredients, it sends a "flavor dispense" signal to the additive transport unit 265 for each required flavoring ingredient. This signal activates the pump 2658 that draws the flavoring ingredient from the flavor additive pouch 264, through the components in the additive transport unit 265, to its inlet port 2671 within the ingredient chute 267. Once within the chute 267, the extracted flavor flavoring ingredient is combined with shaved ice generated by the ice fragmentation unit 24 and deposited within the cup. The control unit 16 causes the additive transport unit 265 to dispense the flavoring ingredient for a predetermined default duration that is known to be sufficient to transport enough of the flavoring ingredient from the flavor additive pouch 264 to the cup to produce the desired flavor in the beverage. At the end of this duration, the control unit 16 causes deactivation of the pump 2658 that was drawing flavoring ingredient from the flavor dispensing pouch 264 through the additive transport system 265 to the ingredient chute 267 and stops dispensing flavor to the beverage.

The control unit 16 may adjust the timing of the flavor dispensing unit 26 and the ice fragmentation unit 24 to deliver one or more flavor ingredients before, during or after shaved ice and/or water is/are delivered to the cup for the beverage. This could be done to ensure a better distribution of flavors throughout the beverage, which may differ based on the type of beverage and/or flavoring selected by a customer. For example, the flavoring for a smoothie may be found to be more evenly distributed throughout the beverage when flavoring ingredients are added at the same time as shaved ice, whereas the flavoring for a slushie may benefit from adding flavors only after the shaved ice is added to a cup. In a case where a customer requests a slushie, the control unit 16 may delay sending flavor dispense signals to the flavor dispensing unit 24 until the ice fragmentation unit 24 has finished dispensing shaved ice into the cup.

The addition of any given flavor to a beverage is associated with the extraction of a known quantity of its respective flavor ingredient. This can also be expressed as the length of time during which the flavor dispense signal is sent by the control unit 16 to cause the additive transport system 265 to extract this known quantity from its respective instance of the flavor additive pouch 264. For example, adding a "banana" flavor to a beverage involves running the additive transport system connected to the banana flavor additive pouch for 5 seconds.

In the embodiment presented above, the components of the flavor storage area 261 and the flavor transport system 263 are incorporated within the housing 13. In alternative embodiments, some of these components may be located outside of the housing 13 in order to conserve counter space within an establishment.

For example, in some embodiments, the components of the flavor storage area 261, such as the flavor additive compartment 260 and the flavor additive cradles 262 may be stored in a remote location, such as in a compartment that is proximate to the beverage production apparatus 10 or in a separate room. In these embodiments, certain components of the flavor transport system 265 (namely, the male fitment 2651) are co-located with the flavor storage area 261 and are connected to the rest of the system 265 through an extension of the additive transport line 2659 that remains in the housing 13.

In other embodiments, the components of both the flavor storage area 261 and the flavor transport system 263 are located outside of the housing 13. In this case, almost the entire flavor transport system 263 (including the infra-red sensor 2653, the vacuum switch 2655, the check valve 2656, the pump 2658, the adjustable valve 2657 and certain portions of the additive line 2659) may be located outside of the housing 13. While each of the additive lines 2659 would still terminate at the ingredient chute 267, extensions of these lines would connect the chute 267 to the rest of the flavor transport system 263 that would be located elsewhere.

These alternative embodiments can allow certain benefits including the expansion of the flavor storage area 261 to accommodate more flavors and/or the provision of flavor additive pouches 264 with larger capacities than could be otherwise accommodated if they were contained within the housing 13. The ability to add more flavors to the flavor storage area 261 provides a customer with more choices in flavoring their beverage, thus increasing the likelihood that a customer will purchase a beverage produced by the apparatus and subsequent revenues. Moreover, the provision of flavor additive pouches 264 with larger capacities allows the uninterrupted production of beverages using these flavor additives for longer periods, which may be advantageous thr very popular flavors, as well as during periods of peak usage.

In particular, implementing the alternative embodiments whereby components of the flavor dispensing unit 26 are located outside of the housing 13 may allow a considerable reduction in the overall size (width) of the apparatus 10. By removing the space required for the flavor storage area 261 and the flavor transport system 263 from the housing 13, the operator regains valuable counter space that could be used for other revenue-generating products.

d) Water Dispensing Unit 28

The water dispensing unit 28 is configured to dispense water to prepare beverages, and in some cases for other purposes, such as to sanitize components of the beverage production apparatus 10, to clear ice jams, and/or to make ice in embodiments where the ice maker 39 is provided.

More particularly, certain beverages produced by the beverage production apparatus 10 include water as one ingredient. Depending on the type of beverage to be produced, the water may be non-heated water (e.g., water at tap temperature) or heated water. Other units within the beverage production apparatus 10 may also use water, such as the sanitizing unit 37, the shower unit 98, and the ice maker 39 that may be optionally integrated in the ice supply unit 22.

Figure 13:
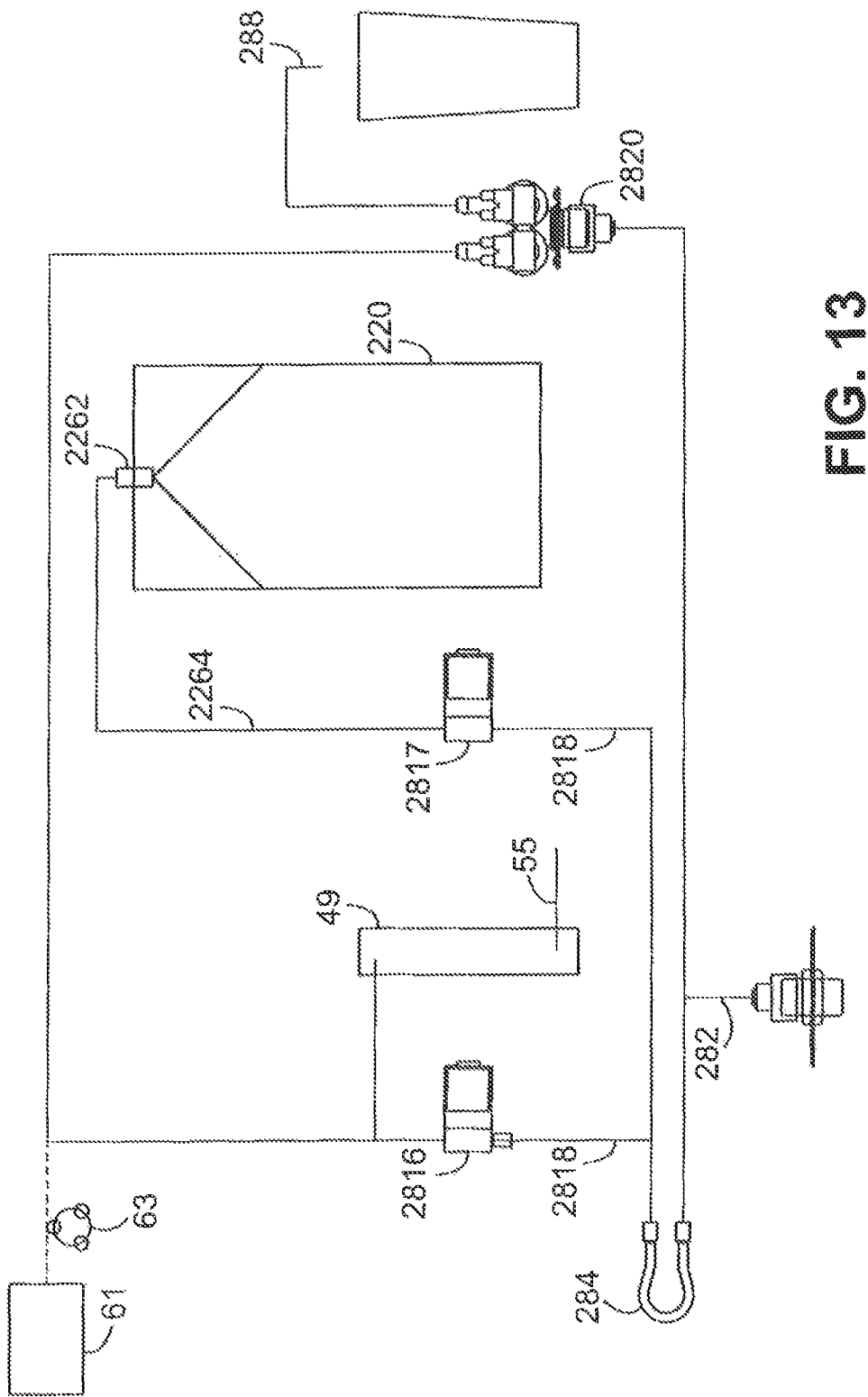
FIG. 13 shows various components of the apparatus of FIG. 1, including components of a water dispensing unit.

To this end, the beverage production apparatus 10 comprises the water dispensing unit 28 to provide water for the production of beverages, as well as for other operations (e.g., sanitation and ice jam clearance). In this embodiment, as shown in FIG. 13, the water dispensing system 28 comprises:

A fresh water line 282 that is connected a source of pressurized tap water;

A water heater 284 that is used to heat water for hot beverages (e.g., coffee) or other purposes; and A water outlet 288 that is connected to the fresh water line 282 and the ingredient chute 267.

Pressurized tap water enters the beverage production apparatus 10 through the fresh water line 282 from its source. The water line 282 is then divided in order to supply water to the water heater 284, as well as to provide water to other units.

A fresh water dispense valve 2820 is used to connect the fresh water line 282 with the water outlet 288 connected to the ingredient chute 267. The fresh water dispense valve 2820 is connected to the control unit 16 and is activated by a "water dispense signal" sent by this unit to permit water at regular temperature (e.g., water at tap temperature) to flow from the fresh water line 282 to the water outlet 288 connected to the ingredient chute 267. In this way, a given quantity of non-heated water can be transferred to the ingredient chute 267 to be combined with one or more flavoring ingredients and shaved ice to prepare a beverage.

The water heater 284 comprises a heating element such as an inline heating element or a boiler. The heating element 286 is configured for heating water within the beverage production apparatus 10 and may also hold water that has already been heated to a predetermined temperature. Through these components, heated water can be prepared and maintained within the apparatus 10.

The water heater 284 is linked to a first hot water dispense valve 2816, a second hot water dispense valve 2817 and a hot water dispense line 2818 that are used to dispense and transport heated water from the boiler 286 to a particular destination. The hot water dispense valves 2816 and 2817 are connected to the control unit 16 and are activated by a "hot water dispense" signal sent by this unit to permit hot water to flow from the water heater 284 through the connected hot water dispense line 2818.

Depending on the operation being performed, either the first hot water dispense valve 2216 or the second hot water dispense valve 2217 may be activated by the control unit 16, which allows heated water to flow through the hot water dispense line 2218. The hot water dispense valves 2216 and 2217 are activated based on the following signals that may be sent by the control unit 16:

In the case of the "hot water dispense signal" mentioned above, the first hot water dispense valve 2816 activated to allow heated water to flow from the water heater 284 to the water outlet 288 and ingredient chute 267, where the water will be used to produce a beverage;

In the case of the "chamber clean" signal described previously, the second hot water dispense valve 2817 is activated to allow heated water to flow from the water heater 284 and be combined with sanitizing agent from the sanitizing unit 37 at the spray head 2262 within the hinged door 226 in order to sanitize the interior of the ice chamber 220;

In the case of the "jam clear" signal described previously, the second hot water dispense valve 2817 is activated to allow heated water to flow from the water heater 284 directly to the spray head 2262 in order to melt ice within the ice fragmentation unit 24 and clear an ice jam; or In the case of a "clean mixer" signal, the first hot water dispense valve 2816 is activated to allow heated water from the water heater 284 to flow to the unit 37 in order to perform sanitizing operations that will be described later.

In this way, a given quantity of hot water from the water heater 284 can be transferred to either the ingredient chute 267 (to be combined with flavoring ingredients used in hot beverages, such as for tea, coffee and/or coffee-flavored drinks, such as cappuccinos), to the spray head 2262 integrated within the hinged door 226 situated above the ice chamber 220 (to be used to clean the ice chamber 220 or clear an ice jam), or to the sanitizing unit 37 (to be used for sanitizing operations described later).

In an alternative embodiment, the fresh water line 282 can be connected to the water heater 284, the water outlet 288, and the ice maker 39 if provided. However, if the ice maker 39 is connected to its own dedicated water supply, this supply may be identical to the fresh water line 282.

e) Milk Product Dispensing Unit 30

The milk product dispensing unit 30 is configured to store one or more milk products and dispense any of the one or more milk products to prepare a beverage. As mentioned above, a milk product can be a natural milk product such as milk or cream, or an artificial milk product that has a taste simulating its natural counterpart. In this embodiment, each milk product is a liquid milk product, but in other embodiments, a milk product can be a powder milk product.

More particularly, certain types of beverages produced by the beverage production apparatus 10 use a milk product as one ingredient, such as milkshakes and certain types of smoothies. The milk product dispensing unit 30 is thus used to provide one or more milk products for the production of beverages. In this embodiment, the milk product dispensing unit 30 comprises:

A milk product storage system 302 that stores a milk product;

A milk product transport system 304 that transfers some of the milk product from the milk product storage system 302, as well as monitor the overall level of milk product; and A milk product dispensing outlet 306 that dispenses the transferred milk product to an appropriate station in the transporting unit 36, which will be discussed later.

The milk product storage system 302 comprises a milk product storage compartment 3020 and a milk product storage container 3022 that are used to store a milk product within the beverage production apparatus 10. The milk product storage compartment 3020 is a compartment that is formed through two laterally-spaced side walls, a top wall, a back wall and a bottom floor area. The front panel of the beverage production apparatus 10 also acts as the front wall of the milk product storage compartment 3020, such that when the front panel of the apparatus 10 is opened, access to the milk product storage compartment 3020 is also provided. While in this embodiment, a single milk product storage container 3022 is included to provide a single milk product, in other embodiments, a plurality of such containers may be provided to provide a variety of milk products.

A thermoelectric cooling unit (not shown) is used to regulate the temperature of the storage compartment 3020 in order to cool and regulate the temperature of its interior space at a level known to be sufficient to preserve the milk product while allowing its extraction from the milk product storage container 3020. The cooling unit used to regulate the temperature of the storage compartment 3020 may be a separate unit or may be the same unit that is used to regulate the temperature of components within the ice supply unit 22. The walls of the milk product storage compartment 3020 are also insulated in order to maintain the optimal temperature for storage of the milk product, thus preventing premature spoilage of the milk product while also extending the operational life of the cooling unit.

The spade within the compartment 3020 is designed to contain the milk product storage container 3022, which holds the milk product for use in beverage production. The milk product may take on various embodiments. For example, in this embodiment, the milk product is a concentrated dairy product in aseptic ultra-high temperature (UHT) processing or high temperature/short time (TST) pasteurization format. The container 3022 is comprised of a main body within which the milk product may be stored, and a detachable top portion that is used to extract the milk product. The main body of the milk storage container 3022 is created from a hollow cylinder that is closed at its bottom, and which defines an interior space for the storage of a given quantity of milk product, such as one (1) gallon. Threads along the top of the exterior of the cylinder that comprises the main body allow the top portion of the container 3022 to be removed from and reattached to its main body.

The top portion of the milk product storage container 3022 is removable and contains a male fitment 308 that extends into its main body and provides for extracting milk product within the storage container 3022 to the milk product transport system 304. Threads along the interior of the top portion correspond to those on the exterior of the main body of the container 3022 and allow the attachment or detachment of the top portion to/from the main body. This allows an operator to remove the top portion in order to refill the milk product storage container 3022 with milk product.

The process used by the operator to fill or refill the milk product storage container 3022 involves first opening the front panel of the beverage production apparatus 10 in order to access the milk product storage compartment 3020. The operator may then unscrew the top portion of the milk product storage container 3022 to remove it from its main body and expose a void formed by the top of the cylinder that opens into the interior of the container 3022, and which allows the addition of a given quantity milk product.

It should be noted that the operator may optionally detach the male fitment 308 integrated within the top portion of the milk product storage container 3022 before detaching the top portion from the main body. This may allow an operator to move the entire container 3022 rather than just its main body. This would also be done in the case where an operator wishes to clean the entire milk product storage container 3022.

In an alternate embodiment, the main body of the milk product storage container 3022 and the male fitment 308 may be provided to the operator as single-use components while only the top portion of the storage container 3022 (excluding the male fitment 308) is reusable. This alternate embodiment may be used to allow faster replacement of the milk product while also protecting against inadvertent flavor and/or bacterial contamination that may occur as a result of incomplete or insufficient cleaning of the storage container 3022.

In this embodiment, the operator can replace the milk product by first detaching the top portion of the milk product storage container 3022 from an empty main body, as before. He or she would then remove the male fitment 308 from the top portion and discard (or recycle) both the fitment 308 and empty storage container 3022 before unsealing the following components:

a (second) main body of a new single-use container that has a full quantity of milk product; and a new instance of the male fitment 308.

The operator would then attach the new instance of the male fitment 308 to the reusable top portion of the storage container 3022 so that the milk product may be extracted. Next, the operator would immerse the new instance male fitment 308 within the milk product in the second main body before continuing.

Once the operator has refilled (or has replaced) the milk product storage container 3022 with a full quantity of milk product, (the amount of which may be identified with an appropriate line or marking), he or she screws the top portion of the container 3022 back on to its main body and then reinserts the milk product storage container 3022 to the milk product storage compartment 3020 within the apparatus 10. The operator completes the process by closing the front panel of the apparatus 10 to seal the milk product storage compartment 3020 inside. In this way, an operator can replace the milk product storage container 3022 quickly while ensuring the milk product inside maintains maximum freshness and taste.

The milk product transport system 304 is used to draw milk product from the milk product storage container 3022 and transport it to the cup in which the beverage is prepared via the milk product dispensing outlet 306. The transport system 304 is also used to monitor the level of milk product remaining within the milk product storage container 3022 and alert the operator when the container is empty. The milk product transport system 304 comprises:

A female fitment 3010 designed to connect to the male fitment 308 integrated in the milk product storage container 3022;

A transport line 3012 to transport the milk product through the components of the milk product transport system 304;

A pump 3015 (e.g., a peristaltic pump, a vacuum pump) used to provide suction for transporting the milk product through the components of the milk product transport system 304;

The female fitment 3010 forms one terminal end of the transport line 3012 and is designed to fit the male fitment 308 that is integrated into the top portion of the milk product storage container 3022. The fitments 308 and 3010 may be detached from and reattached to each other in order that an operator may remove and/or clean the container 3022. The interconnecting design of the fitments 308 and 3010 allows the milk product storage system 302 and the milk product transport system 304 to draw milk product from the milk product storage container 3022 through the milk product transport system 304 via the transport line 3012 to the milk product dispensing outlet 306 that deposits it within the cup used for the beverage.

The interconnection between the various components of the milk product dispensing unit 30 also allows the vacuum pump 3015 in the milk product transport system 304 to detect when the milk product storage container 3022 is empty. The pump 3015 can be connected to the control unit 16 and sends a "milk product empty" signal when there is no milk product or a level of milk product below a particular threshold left in the storage container 3022.

In an alternate embodiment, an optical sensor that is integrated within the milk product storage container 3022 may be used to detect when there is no milk product left in the storage container 3022 and subsequently send a "milk product empty" signal to the control unit 16.

Upon receipt of this signal, the control unit 16 prevents the production of beverages that use the milk product as an ingredient (such as by "locking out" options for such beverages on the user interface 50) and may alert the operator that a refill of the milk product storage container 3022 with milk product is required through some visual or auditory means. Once the storage container 3022 has been refilled with milk product, the pump 3015 (or the optical sensor) detects the milk product and sends a "milk product OK" signal to the control unit 16.

Upon receipt of this signal, the control unit 16 re-enables the selection of beverages that use the milk product as an ingredient.

An example of the operation of the milk product dispensing unit 30 will now be presented. In this example, assume that the beverage production apparatus 10 is producing a beverage that includes some quantity of the milk product, such as a milkshake or a particular type of smoothie. Further assume that the milk product storage container 3022 contains a sufficient quantity of milk to produce the desired beverage and that a cup is positioned below the milk product dispensing outlet 306.

When the cup in which the beverage will be prepared is in position below the milk product dispensing outlet 306, the control unit 16 sends a "milk product dispense" signal to the milk product dispensing unit 30. Upon receipt of this signal, the vacuum pump 3015 is activated and generates suction within the milk product transport system 304 that extracts milk product contained within the milk product storage container 3022 through the interconnected fitments 308 and 3010 into the transport line 3012 attached to the male fitment 3010. Once sufficient negative pressure is generated within the milk product storage container 3022 and/or transport system 304 for transport to occur, the milk product flows through the transport line 3012 until it reaches the terminal end of the line 3012 connected to the milk product dispensing outlet 306. The milk product then flows out from the dispensing outlet 306 into the cup in which the beverage will be prepared.

The control unit 16 sends the "milk product dispense" signal for a preset duration known to be sufficient to ensure that enough of the milk product has been transferred to the cup in order to produce the desired taste and/or consistency for the beverage. At the end of this period, the control unit 16 terminates the "milk product dispense" signal, which stops the operation of the vacuum pump 3015 and ends the flow of milk product to the cup.

Mixing Unit 14

The mixing unit 14 is configured to mix ingredients dispensed by the dispensing system 12 to prepare a beverage to be produced by the beverage production apparatus 10.

More particularly, in order to produce a beverage with the consistency and flavor desired by the customer, its constituent ingredients, such as shaved ice, water, one or more flavoring ingredients, and/or milk product need to be thoroughly mixed. To meet this need, the mixing unit 14 mixes the ingredients for a beverage, in this case within the cup used to prepare and serve the beverage.

In this embodiment, the mixing unit 14 comprises a mixer 142 that provides mixing functionality for a beverage and a mixer elevator 144 that shifts the vertical position of the mixer 142. Both the mixer 142 and mixer elevator 144 are connected to the control unit 16 such that both components can be controlled and their status monitored by the unit 16.

The mixer 142 comprises a mixer motor 146 and a mixing element comprising a mixer shaft 148 and one or more mixing blades 1410. The mixer shaft 148 extends vertically downwards from the mixer motor 146 while the mixing blade(s) 1410 extend outwardly from the shaft 148. The mixing blade(s) 1410 are attached to or integrally formed with the shaft 148 so that that when the shaft 148 is rotated, the blades 1410 rotate in the same general direction.

The mixer elevator 144 is used to shift the mixer 142 between two (2) or more, in this case three (3), vertical positions depending on the operation being performed. Although the mixer elevator 144 is presented here as a separate unit, this component may be combined with the mixer motor 146 so that a single unit could be used to both raise/lower the mixer shaft 148/mixing blade 1410 assembly, as well as drive this assembly during ingredient intermixing.

By default, the mixer elevator 144 keeps the mixer 142 in a first raised vertical position that allows one of the following situations to occur:
- A cup containing beverage ingredients may be placed below the mixer 142 by the transporting unit 36 to allow ingredient intermixing to take place; or
- A container of hot water and/or sanitizing solution may be placed below the mixer 142 to allow sanitizing of the mixer 142 to take place.

The mixer elevator 144 can also lower the mixer 142 to two (2) lowered vertical positions to allow for beverage intermixing or mixer component sanitizing, namely of the mixer shaft 148 and the mixing blade(s) 1410. Before the mixer elevator 144 can lower the mixer 142, the transporting unit 36 or sanitizing unit 37 places a cup or container underneath the mixer 142, so that its contents (e.g., beverage ingredients or sanitizing solution) are directly below the mixer shaft 148. Once in this position, the mixer elevator 144 may lower the mixer 142 to the following lowered vertical positions:
- a second intermediate lowered vertical position whereby the mixer shaft 148 and mixing blade(s) 1410 are partially immersed within the cup contents or sanitizing solution; or
- a third maximally lowered vertical position where the mixer shaft 148 and mixing blade(s) 1410 are partially immersed within the cup contents or sanitizing solution to a greater extent than when the mixer 142 is in its second lowered intermediate position.

In addition, the mixer elevator 144 can adjust the position of the mixer 142 between the second and third vertical positions during beverage mixing or sanitation operations to vary the degree to which the mixer shaft 148 and the mixing blade(s) 1410 are immersed within the contents of the cup or container. In this way, a better intermixing of beverage ingredient or more thorough cleaning of the components of the mixer 142 may be performed.

An example of the operation the mixing unit 14 will now be presented. For this example, assume that the constituent ingredients of a milkshake comprised of given quantities of milk product, shaved ice, water and flavoring ingredient have been added to a cup that is being conveyed by the transporting unit 36. Further assume that the mixer 142 is currently in its first raised vertical position.

The control unit 16 causes the transporting unit 36 to move the cup containing the milkshake ingredients to the station associated with the mixing unit 14, and more specifically, into a position where the cup is situated directly below the mixer 142. Once the cup's position is confirmed by the transporting unit 36, the control unit 16 issues a first "intermix prepare" signal to the mixing unit 14. Upon receipt of this signal, the mixer elevator 144 lowers the mixer 142 from its first raised position to its second lowered position. In this lowered position, the mixer 142 is in contact with the constituent ingredients of the milkshake, and more specifically, the mixer shaft 148 and the mixing blade(s) 1410 are all now partially immersed within the beverage's ingredients.

The control unit 16 then sends a "intermix" signal to the mixer 142. Upon receipt of this signal, the mixer motor 146 is activated and begins to rotate the mixer shaft 148 until it reaches a preset rotational speed. In this embodiment, the control unit 16 can control the rotational speed of the mixer shaft 148 (e.g., by progressively and controllably ramping it up and down) to avoid spilling. The forward rotation of the mixer shaft 148 rotates the attached mixing blades 1410 in the same direction, causing a thorough intermixing of the constituent ingredients of the milkshake.

Once the mixer shaft 148 has reached the preset rotational speed, the control unit 16 then sends an "intermix blend" signal to the mixer elevator 144 that causes it to vertically shift the mixer 142 (and particularly the mixer shaft 148 and mixing blade(s) 1410) between its second lowered and third lowered positions. For example, the control unit 16 may send the "intermix blend" signal for a duration to ensure that the mixer shaft 148 and the mixing blade(s) 1410 are shifted through their second and third vertical positions between four (4) to five (5) times during the intermixing period.

The combination of the rotation of the mixing blade(s) 1410 and the vertical movement of the mixer shaft 148 and mixing blade(s) 1410 during intermixing operations helps ensure that all constituent ingredients of the milkshake are both thoroughly mixed and that the consistency of the milkshake will match the expectations of the customer.

The control unit 16 sends the "intermix" and "intermix blend" signals to the mixer 142 and mixer elevator 142 for a predetermined period of time that is known to be sufficient to thoroughly mix the ingredients for each type of beverage to produce the desired flavor and consistency. At the end of this duration, the control unit 16 terminates these signals, which deactivates the mixer motor 146 and subsequently stops the rotation of the mixer shaft 148 and mixing blades 1410, as well as returns the mixer 142 to its second lowered position.

Although mixing is complete, the cup cannot move because the mixer shaft 148 and the mixing blades 1410 are still partially immersed within the now-mixed beverage. The control unit 16 then sends a second "intermix prepare" signal that causes the mixer elevator 144 to elevate the mixer 142 back to its raised first vertical position in order to allow the transporting unit 36 to move the container in which the beverage is prepared to the next station. This also identifies the point at which the sanitizing unit 37 can be used to sanitize the mixer 142 in order to prepare it for the next beverage.

In the embodiment described above, the duration of the "intermix" and "intermix blend" signals that controls the operation of the mixer 142 and mixer elevator 144 respectively, as well as the rotational speed of the mixer motor 146, is controlled entirely by the control unit 16 and are based on preset values known to be sufficient for beverage ingredient intermixing. In an alternative embodiment, a customer or operator could adjust (or even override) the duration of these signals (or the rotational speed of the mixer motor 146) sent by the control unit 16 to the mixer unit 14 during operation in order to customize the appearance, flavor and/or consistency of the produced beverage.

For example, assume that the apparatus 10 provides a hot or iced cappuccino option among its available beverages. When the hot version of this beverage is selected, the rotation of the mixer blades 1410 during intermixing causes one of its constituent ingredients to create a layer of bubbles that simulates the milk foam covering of traditionally-produced cappuccinos. Further assume that the apparatus 10 offers the ability for customers to customize their beverage via the user interface 50, such as through offering "less foam" and/or "extra foam" options. The use of these options adjusts the mixer's 142 intermixing duration and or rotational speed that is used to mix beverage ingredients. For example, assume that a customer uses the user interface 50 to initiate the production of a hot cappuccino with extra foam. In this case, the control panel 16 could do one or both of the following to generate this extra foam:
- extend the duration during which the "intermix" and "intermix blend" signals are sent to the mixer 142; and/or increase the rotational speed of the mixer motor 146 by a certain amount so that the mixer shaft 148 and attached mixing blade(s) 1410 revolve faster and produce more foam as a result.

These actions produce a thicker layer of foam (i.e. bubbles) than would have otherwise been created by the default duration. While this example illustrates adjusting the intermixing duration and/or rotational speed to change the appearance of a beverage, a similar method could be used to adjust the flavor and/or consistency of beverages where a thickening agent is used to produce a beverage where a certain consistency is expected, such as in smoothies and milk shakes.

In the embodiment described above, the mixing unit 14 is used solely for the purpose of mixing beverage ingredients that were added elsewhere in the beverage production apparatus 10, such as by the ice fragmentation unit 24, the flavor dispensing unit 26, and/or the water dispensing unit 28. In an alternative embodiment, one or more beverage ingredients could also be dispensed at the station where the mixing unit 14 mixes the ingredients just prior to mixing. In such an embodiment, one or more beverage ingredients may be added to the cup just before the mixer 142 and the mixing elevator 144 are used to mix beverage ingredients using the operation described above. The ingredients dispensed at this point may include any ingredient dispensable by the dispensing system 12 (e.g., a flavoring ingredient, water, milk product) and/or one or more ancillary ingredients, for instance, that may be temperature-sensitive and should be added just prior to ingredient intermixing (such as nutritional supplements or vitamins).

Transporting Unit 36

The transporting unit 36 is configured to transport a cup in which a beverage is prepared and served between a plurality of stations at which different beverage preparation operations are performed. These stations include at least one (1), and in this embodiment, two (2) dispensing stations where the dispensing system 12 dispenses ingredients to prepare a beverage and a mixing station where the mixing unit 14 mixes these ingredients to produce the beverage.

More particularly, in this embodiment, the transporting unit 36 is configured to transport a cup between the following four (stations):

A cup entry/exit station 3610;
A milk product dispensing station 3612;
An ice/water/flavor dispensing station 3614; and
A mixing station 3616

Each beverage preparing operation that occurs at a station is provided by the functionality of one or more of the units identified previously. The following table identifies the units associated with each station, as well as provides brief description of its purpose.

| Station Name | Associated Unit(s) | Purpose |
| --- | --- | --- |
| Cup entry/exit station 3610 | Cup detection unit 102 | Entry point for empty cup and exit point for cup containing produced beverage. |
| Milk product dispensing station 3612 | Milk product dispensing unit 30 | Addition of milk product to beverage. |
| Ice/Water/Flavor dispensing station 3614 | Ice fragmentation unit 24 Flavor dispensing unit 26 Water dispensing unit 28 | Addition of shaved ice, water and/or flavor ingredient(s) to prepare beverage. |
| Mixing station 3616 | Mixing unit 14 | Intermixing of beverage ingredients. |

In this embodiment, of the stations reachable by the transporting unit 36, the cup entry/exit station 3610 is the only station that is normally accessible to a customer and/or operator. The remaining stations in the transporting unit 36 (3612, 3614 and 3616) are situated within the housing 13 deliberately out of reach of customers and operators. This helps to protect operators and/or customers from coming into contact with certain hazards during operation of the beverage production apparatus 10, such as the rotation of the mixing blade(s) 1410.

The transporting unit 36 is configured to move the cup between the stations. To this end, in this embodiment, the transporting unit 36 comprises:

a transport motor 362;
a transport shaft 364;
an armature 366; and
a cup support 368.

The transport motor 362 provides the motive force that drives the operation of the transporting unit 36 and is controlled by signals sent from the control unit 16. The motor 362 is connected to the transport shaft 364 such that its power is translated into rotation of the shaft 364 in the same general direction. The armature 366 is connected to the transport shaft 364 on one end and the cup support 368 at its other end, so that any power supplied by the motor 362 that rotates the shaft 364 also causes a similar rotation of the armature 366 and the container support 368. In this way, the operation of these components may define a path (in this case, a circular path) along which the stations reachable by the cup are situated.

The cup support 368 supports the cup during its transport. In this embodiment, the cup support 368 comprises a pair of support arms 3682 and 3684 and a rear support 3686. Each of the support arms 3682 and 3684 is shaped concavely so that at point where they attach to the armature 366 relative to each other, a top-down view of the container support would form the shape of the letter C. The lateral spacing of the support arms 3682 and 3684 is intentionally slightly smaller than the diameter of the circumference of the top lip of the cup or container that the container support 368 is designed to accommodate.

The rear support 3686 extends downwards from the point at which the support arms 3682 and 3684 are joined and where the container support 368 joins to the armature 366. The angle of the rear support 3686 is intentionally offset from the perpendicular by an amount that approximates the angle of the sidewall of a typical cup used to contain beverage for the apparatus 10. The offset angle of the rear support 3686 counteracts the tendency for the bottom of a cup that is filled with beverage ingredients (or a completed beverage) to shift position during movement, such as due to centrifugal force generated from rotation. As a result, the components in the cup support 368 allow a customer or operator to insert or extract a cup from the support 368 while helping ensure that the cup remains in place during beverage production operations.

Through these components, a customer can position an empty cup for their beverage anywhere within the void between the support arms 3682 and 3684, and upon the release of the cup by the customer, the cup support 368 can catch and support the released cup just below its top lip. The support arms 3682 and 3684, as well as the rear support 3686, positively engage and secure the cup and its ingredients as it is rotated between stations in the beverage production process.

It will be appreciated that the cup support 368 described above represents only one possible embodiment of such a support, and that various other possible embodiments exist for this support.

An example of the operation of the transporting unit 36 will now be presented. In this example, assume that a customer has indicated that they want the beverage production apparatus 10 to produce a strawberry smoothie. Further assume that this smoothie will contain given quantities of milk product, shaved ice, non-heated water and a strawberry flavoring ingredient. Finally, assume that the cup support 368 is currently empty and that the cup support 368 is ready to receive a cup at the cup entry/exit station 3610.

The customer is initially prompted to insert a cup into the cup support 368 in order to initiate the operation of the transporting unit 36. Once the customer inserts a cup to the cup support 368 at the cup entry/exit station 3610, the control unit 16 receives a signal from a cup detection unit 102 (described later) that confirms the cup's insertion and identifies its size. This signal allows the control unit 16 to determine the quantities of beverage ingredients (e.g., milk product, shaved ice, water, and flavoring ingredient(s)) needed to produce the smoothie.

The control unit 16 sends a first "transport" signal to the transport unit 36, which activates the transport motor 362. The motor 362 then spins the transport shaft 364, which in turn rotates the armature 366 and the cup support 368 containing the cup for the smoothie from the cup entry/exit station 3610 to the next station involved in beverage production.

It is worth noting that while all stations are accessible by the transporting unit 36, different beverage types may access a different set of stations during production. For example, the following table identifies a set of stations that may be accessed by each general beverage type during its production and also shows the order in which stations are accessed:

| Beverage Type | Cup entry/ exit station 3610 | Milk product dispensing station 3612 | Ice/Water/Flavor dispensing station 3614 | Mixing station 3616 |
|---|---|---|---|---|
| Slushie | Yes | No | Yes (shaved ice + flavor(s) + optionally water) | Yes |
| Smoothie/Milk Shake | Yes | Yes | Yes (shaved ice + flavor(s)) | Yes |
| Hot beverages (e.g., coffee) | Yes | Yes, if milk product requested | Yes (hot water + flavor(s)) | Yes |

Since the beverage in this example is a smoothie, the next station involved in its production is the milk product dispensing station 3612. The control unit 16 thus causes the transporting unit 36 to move the cup from the cup entry/exit station 3610 to the milk product dispensing station 3612. Once the control unit 16 identifies that the cup has reached the station 3612, it causes deactivation of the transport motor 362.

With the cup at the milk product dispensing station 3612, the milk product dispensing unit 30 adds milk product for the smoothie into the cup through an operation similar to that which was previously described for this unit. Once this operation is complete, the control unit 16 sends a second transport signal to the transporting unit 36 to move the cup to the next station required for beverage production. This sequence is repeated using a third and a fourth transport signals to move the cup through the remaining stations in the production process (i.e. the ice/water/flavor station 3614 and the mixing station 3616 in this case) and produce the finished smoothie.

When the smoothie is ready for consumption, the control unit 16 sends a fifth transport signal in order to return the cup containing the finished smoothie to the cup entry/exit station 3610. The customer then removes the cup containing the finished smoothie from the cup support 360, such as by raising and/or pulling the cup through the gap between the support arms 3682 and 3684. With the container support 368 now empty, the transporting unit 36 is ready to repeat the operation described above for the cup to be used for the next beverage.

In one alternative embodiment, the units associated with each of the stations 3610, 3612, 3614 and 3616 may differ from those identified above. For example, the water dispensing unit 28 and flavor dispensing unit 26 may be associated with the milk product dispensing station 3612 in order to allow beverages that do not use ice as a main ingredient (such as hot beverages) to bypass this station entirely. This example presents only one possible organization of units and stations, as other arrangements axe possible.

Also, in the embodiment described above, the mixing station 3616 provides intermixing functionality for beverage ingredients through the mixing unit 14. As mentioned above, in an alternative embodiment, the mixing station 3616 may also allow beverage ingredient dispensing functionality. In this case, one or more beverage ingredients may be dispensed at the mixing station 3616 prior to the operation of the mixer unit 14 described previously.

Furthermore, in the embodiment described above, the transporting unit 36 has access to four (4) stations, 3610, 3612, 3614 and 3616. In other embodiments, the number of stations can be increased or decreased to accommodate different designs that handle various situations. For example, assume it becomes necessary that the water dispensing unit 28 be separated from the ice fragmentation unit and/or flavor dispensing unit 30. In such a case, a "water station" representing the location of the water dispensing unit 28 within the apparatus 10 could be added to be reached by the transporting unit 36. Alternatively, the integration of the mixing unit 14 with the other units associated with the ice/water/flavor station 3614 could result in the elimination of the mixing station 3616.

In addition, in the embodiment described above, the stations 3610, 3612, 3614 and 3616 reachable by the transporting unit 36 are arranged along a horizontally-oriented circular path defined by the rotation of the transporting unit 36. In an alternative embodiment, the stations reachable by the transporting unit 36 may be arranged along a path that follows a different shape and/or orientation. For example, the stations 3610, 3612, 3614 and 3616 may be arranged such that a cup is transported by the transporting unit 36 along a straight linear path instead of a circular path. As another example, the stations 3610, 3612, 3614 and 3616 may be arranged relative to each other vertically so that a cup would travel vertically up and/or down during beverage production. Such configurations may be used to allow the apparatus 10 to occupy less space or conform to certain set dimensions. In such an embodiment, the transporting unit 36 and/or the sequence of operations may be adjusted to accommodate the different path and/or orientation that the stations occupy. For example, assume that the stations 3610, 3612, 3614 and 3616 are arranged in a linear vertical orientation rather than a circular horizontal orientation. In this case, the cup support 368 may include a structure to support the bottom of a cup being transported to relieve pressure on the support arms 3682 and 3684 as the beverage moves up and down between stations.

Sanitizing Unit 37

The sanitizing unit 37 is configured for sanitizing the mixing element of the mixing unit 14 after this element has mixed the ingredients in the cup.

More particularly, during normal operations, components of the mixing unit 14, and in particular the mixer 142, may be used to mix ingredients for many beverages, each of which may contain a different set of ingredients. As a result, the potential exists for flavor cross-contamination between beverages whereby some residue from the flavoring ingredients (s) used to produce a previous beverage are inadvertently added to the flavor ingredient(s) of the current beverage. If enough of the flavoring residue remains on the mixer 142 from the previous beverage, the consumer of the current beverage (as well as potential future customers) may detect this unwanted flavor. Cross-flavor contamination may result in a dissatisfied customer who may want a replacement beverage, demand a refund or simply avoid the apparatus 10 in the future.

Components of the mixer 142, namely the mixer shaft 148 and the mixing blades 1410, may also be exposed to bacterial or other organic contamination that could be introduced to beverages. Although the term "bacterial contamination" will be used here, this term is used to encompass contamination from both bacteria and other contaminants, such as viruses, organic and inorganic particulate matter. This type of contamination can occur when bacteria and other particulates are inadvertently introduced to the surfaces of the mixer 142 components identified above and subsequently collect and/or multiply on these surfaces. Since the components 148 and 1410 come into contact with each beverage that is produced, any bacteria or other organic contaminants that reside on their surfaces could be introduced to beverages, which may result in physical discomfort or sickness for a customer during or after consumption.

Thus, it may be useful to prevent both flavor cross-contamination as well as bacterial contamination from the mixer 142 to maximize customer satisfaction, protect operator revenue and ensure public safety. While the materials used in the construction of the mixer shaft 148 and the mixing blade(s) 1410 may provide some assistance in the prevention of both types of contamination, a better solution would be to clean these components on a regular basis (e.g., between beverages) to remove both flavor residue and bacterial contaminants.

Thus, the sanitizing unit 37 is used to clean components in the mixer 142 that come into contact with the beverage ingredients using hot water and/or a sanitizing solution, which may be made by combining sanitizing agent and water in a solution. In this embodiment, the sanitizing unit 37 comprises a sanitizing chamber 49, a sanitizing chamber transport system 51 used to move the chamber 49 in to and out of place, a sanitizing agent system 53 that provides a sanitizing agent used to sanitize the mixing element of the mixer 142, and a waste egress system 55 that disposes of the waste materials removed from the mixer 142.

The sanitizing chamber 49 is used during operation of the sanitizing unit 37 to hold the hot water, sanitizing agent, or some combination of these two components, that is used to clean the mixer 142. The sanitizing chamber 49 comprises a hollow cylinder with a diameter that is slightly larger than that defined by the mixing blades 1410 or their rotation therein. The chamber 49 is open at its top to allow entry and exit of the mixer shaft 148 and mixing blades 1410, but is sealed at its bottom in order to contain and allow transport of the solution containing the sanitizing agent. The sanitizing chamber 49 is also equipped with an outlet that allows the drainage of waste materials from the chamber 49 via the waste egress system 55, which will be described later. The sanitizing chamber 49 is also attached to components of the sanitizing chamber transport system 51 in order to allow the chamber 49 to move, as described below.

The sanitizing chamber transport system 51 is used to move the sanitizing chamber 49 between two positions, namely:

- a first retracted position that is used to position the sanitizing chamber 49 away from beverage production activities, in particular the mixer 142, as well as from the movement of components of the transporting unit 36; and
- a second extended position that is used to position the sanitizing chamber 49 for sanitizing operations involving the mixer 142.

The sanitizing chamber transport system 51 comprises an actuated rod 57 (such as an actuated rod based on a proportional solenoid mechanism) and a mounting (not shown) that connects the sanitizing chamber 49 to the actuated rod 57. When the actuated rod 57 is at rest, the sanitizing chamber 49 is kept in its first retracted position for beverage production and/or for sanitizing operation preparation. When the actuated rod 57 is activated, it moves the sanitizing chamber 49 to its second extended position below the mixer 142 so that sanitizing operations can occur.

The use of the actuated rod 57 may prove beneficial because the sanitizing chamber 49 can contain either hot water or sanitizing solution while the transport system 51 is used to move it between its first retracted and second extended positions. As a result, the movement of the sanitizing chamber 49 by the actuated rod 57 may be gradual to prevent spillage of the chamber's contents.

The sanitizing agent that is used to clean components of the mixer 142 is stored and transferred to the sanitizing chamber 49 via the sanitizing agent system 53. This system comprises a sanitizing agent pouch 61 containing the sanitizing agent and a sanitizing agent transport system 63 that transfers a given quantity of the sanitizing agent from the pouch to the chamber 49, where it is combined with a given quantity of heated water from the water dispensing unit 28 to create a sanitizing solution.

The components and general operation of the sanitizing agent system 53 resemble those of the flavor dispensing unit 26 in the following ways:

- the sanitizing agent pouch 61 is physically similar to a flavor additive pouch, with the obvious exception that it contains sanitizing agent rather than a flavoring ingredient;
- the sanitizing agent pouch 61 is kept within a similar cradle and stored in the flavor additive compartment 260 in a similar manner as a flavor additive pouch; and
- the sanitizing agent transport system 63 is connected to, and draws sanitizing agent from, the sanitizing agent pouch 61 using similar components (such as male and female fitments) and methods of operation as those used for a flavor additive pouch (e.g., the flavor additive transport system 265).

Since the components and operation of the flavor additive pouch 264 and additive transport system 265 have been described and their similarity to the sanitizing agent pouch 61 and the sanitizing agent transport system 63 have been identified, further description of the components and operation of the sanitizing agent transport system 63 are unnecessary since they parallel those of the flavor dispensing unit 26.

While the components and operation of the flavor dispensing unit 26 can generally be applied to the sanitizing agent transport system 63, the following differences between the two should be noted:

Unlike the additive transport system 265, the sanitizing agent transport system 63 includes an agent line-out 67 that disperses the sanitizing agent to the sanitizing chamber 49 rather than the ingredient chute 267.

The agent line-out 67 includes a sanitizing agent control valve (not shown) that enables the sanitizing unit 37 to direct sanitizing agent to either the sanitizing chamber 49 or to the spray head 2262 contained in the hinged door of the ice chamber 226 via the spray-in line 2264.

The sanitizing agent transport system 63 includes a mechanism (not shown) to draw and transfer water from the water dispensing unit 28 to the sanitizing chamber 49 in order to dilute the sanitizing agent to produce the sanitizing solution.

The waste egress system 55 is used after sanitizing operations are complete and empties the sanitizing solution and associated waste material from the sanitizing chamber 49 to the drain that is generally used to dispose of waste water. The egress system 55 is comprised of a sanitizing chamber waste drain line 71, a waste drain pinch mechanism 73, and a sanitizing chamber waste drain 75 that is connected to the drainage system for the beverage production apparatus 10 (not shown) in order to dispose of the waste materials in the general waste water/sewage system. The sanitizing chamber waste drain line 71 and the waste drain pinch mechanism 73 are configured for controlling the draining of hot water, sanitizing solution and waste materials from the sanitizing chamber 49 after sanitizing operations are complete. One end of the sanitizing chamber waste drain line 71 is connected to the sanitizing chamber 49 through a void in the chamber's exterior, through the pinch mechanism 73 and terminates at the waste drain 75 that connects to the drainage system for the apparatus 10.

In this embodiment, the sanitizing unit 37 does not contain a pump (such as a peristaltic pump) to drive or control the flow of waste water or materials through the waste egress system 55. This is because both the sanitizing chamber 49 and the waste egress system 55 are vertically higher than the main drain for the beverage production apparatus 10, which allows gravity to be used to assist the flow of waste water and waste materials through the system 55. In an alternative embodiment, however, a pump could be used either to replace or work in conjunction with the other components of the waste egress system 55 described above.

Rather than using a pump, control over the flow of wastewater and waste materials is provided by the pinch mechanism 73 that is comprised of a solenoid actuated rod 77 and a backstop 79, between which the waste drain line 71 passes. When the pinch mechanism 73 is at rest, a compression spring (not shown) forces the rod 77 against the backstop 79 causing a spring load. The entire spring load applied by the compression spring to solenoid actuated rod 77 causes it to pinch the waste drain line 71, thus stopping the flow of wastewater and waste materials to the waste drain 75. However, the solenoid actuated rod 77 can be activated upon receipt of a signal from the control unit 16, which results in its retraction and the subsequent opening of the waste drain line 71 to allow wastewater and waste materials to flow unimpeded through the line 71 to the waste drain 75 and subsequently out of the apparatus 10. Thus, waste materials removed from the components of the mixer 142 can be disposed of.

An example of the operation of the sanitizing 37 unit in cleaning components of the mixing unit 14, particularly the mixing element of the mixer 142, will now be presented. Initiation of sanitizing unit 37 operations are typically triggered by the control unit 16 once it detects the action of the transporting unit 36 in transporting a cup away from the mixing station 3616 after beverage ingredient mixing has been completed. Since components in the mixer 142 (specifically the mixing shaft 148 and mixing blade(s) 1410) should be cleaned after each beverage to prevent cross-flavor and bacterial contamination, this action identifies the starting point for sanitation-related activities to the control unit 16.

In this embodiment, example operations that may be performed by the sanitizing unit 37 to clean the mixer 142 may include the following cleaning cycles:

A first cycle whereby the mixer shaft 148 and mixing blade(s) 1410 are soaked in hot water to loosen and/or remove flavor residue from the previous beverage; and A second cycle whereby the mixer shaft 148 and the mixing blade(s) 1410 are immersed in a sanitizing solution made from a dilution of sanitizing agent and water in order to remove further flavor residue from the previous beverage, as well as any bacterial contamination inadvertently introduced to these components.

Before the commencement of either cycle, the sanitizing chamber 49 is put in its first retracted position by the sanitizing chamber transport system 51. In this position, the chamber 49 can receive hot water and/or sanitizing agent dispensed by the water dispensing unit 28 and sanitizing agent system 53. In addition, the pinch mechanism 73 is set to a resting position, so that the sanitizing chamber waste drain line 71 is closed.

Because the sanitizing chamber 49 is normally kept in its first retracted position during beverage production, the control unit 16 sends a "sanitize mixer" signal to the water dispensing unit 28 to initiate the first cleaning cycle. Upon receipt of this signal, the first hot water dispense valve 2816 is activated to allow hot water to flow from the water heater 284 to the sanitizing unit 37, and particularly to the sanitizing chamber 49. The control unit 16 then sends a first "hot water dispense" signal to the water dispensing unit 28 to dispense heated water to the sanitizing chamber 49. This signal is terminated after a fixed duration known to be sufficient to add enough water to the chamber 49 for the first cleaning cycle.

With the sanitizing chamber 49 suitably full of hot water, the control unit 16 then sends a first "chamber transport" signal to the sanitizing chamber transport system 51. Upon receipt of this signal, the actuated rod 57 is activated, which moves the attached sanitizing chamber 49 in a slow and gradual manner to its second extended position below the mixer 142.

When the sanitizing chamber 49 arrives at its second extended position, the control unit 16 sends "intermix prepare" and "intermix" signals to the mixer 142 and the mixer elevator 144 that cause the mixer shaft 148 and mixer blade(s) 1410 to become immersed within the hot water contained in the chamber 49, but remain immobile (i.e. not rotate). This immersion allows flavor residue remaining on the components 148 and 1410 to be transferred to the hot water as waste materials, as well as loosens up any solid or semi-solid residue that remains on the blade in preparation for the second cleaning cycle.

The control unit 16 may send vary the length of the first cleaning cycle through suitable signaling, depending on the type of beverage previously produced and/or its intermixed ingredients. For example, a thick milkshake consisting of highly mixed milk product, shaved ice and multiple flavoring ingredients may require more time in the first cycle to remove or loosen residue than a simple slushie that includes shaved ice and a single flavoring ingredient.

Upon completing the first cleaning cycle, the control unit 16 returns the mixer 142 to its retracted first vertical position at the end of this cycle. The control unit 16 causes the sanitizing chamber transport system 51 to return the sanitizing chamber 49 in a slow and gradual manner to its first retracted position.

At this point, the control unit 16 sends a "waste disposal" signal to the waste egress system 55. Upon receipt of this signal, the solenoid actuated rod 77 is activated, which results in its retraction and the subsequent opening of the waste drain line 71 to allow wastewater and waste materials from the first cleaning cycle to flow through the line 71 to the waste drain 75 and subsequently out of the beverage production apparatus 10. This signal is sent by the control unit 16 for a specific duration known to be sufficient to drain waste materials from the sanitizing chamber 49, and after which the signal is terminated so that the waste drain line 71 can be dosed and the second cleaning cycle may begin.

To begin the second cleaning cycle, the control unit 16 sends a "clean mixer" signal to the sanitizing unit 37 that causes it to switch the sanitizing agent control valve (not shown) on the agent line-out 67 to a second position that allows sanitizing agent to flow to the sanitizing chamber 49. The control unit 16 then sends an "agent dispense" signal to initiate operation of the sanitizing agent system 53 that causes the sanitizing agent transport system 63 to extract a given quantity of sanitizing agent from the sanitizing agent pouch 61 and transfer it to the sanitizing chamber 49.

Because the sanitizing agent may be provided in a form (such as a thick liquid or gel) that might require it to be diluted with water to form a sanitizing solution, the control unit 16 then sends a second "hot water dispense" signal to the water dispensing unit 28. Upon receipt of this signal, the unit 28 dispenses a given quantity of heated water from the heater 286 to the sanitizing chamber 49. The result of this action causes the dilution of the sanitizing agent and the generation of the sanitizing solution that will be used to cleanse the mixer 142 in the second cleaning cycle. Alternatively, ambient water that may be dispensed by the fresh water dispense value 2820 may also be used to dilute the sanitizing agent and form the sanitizing solution.

With the sanitizing chamber 49 now full of sanitizing solution, the control unit 16 sends a second "chamber transport" signal to the sanitizing chamber transport system 51. As before, the receipt of this signal activates the actuated rod 57 and moves the attached sanitizing chamber 49 in a slow and gradual manner to its second extended position below the mixer 142.

The control unit 16 then issues "intermix prepare", "intermix" and "intermix blend" signals to the mixing unit 14 as if it was blending a beverage. Instead of blending beverage ingredients within a cup, however, the mixer shaft 148 and the mixing blades 1410 are immersed in the sanitizing solution within the sanitizing chamber 49, and their subsequent rotation and vertical motion helps ensure a thorough cleaning of these components. During this period, the control unit 16 monitors and restricts the rotational speed of the mixer 142 (especially of the mixer shaft 148 and the mixing blade(s) 1410 that are driven by the mixer motor 146) to prevent the contents of the sanitizing chamber 49 from being splashed or sprayed elsewhere within or even outside of the apparatus 10 through the cup entry/exit station 3610. This also ensures any removed waste materials (e.g., residual milk products or flavor ingredients) that are suspended within the sanitizing solution in the chamber 49 will be entirely disposed of.

After a predetermined duration that is known to be sufficient to prevent cross-flavor contamination and remove bacterial contamination, the cleaned mixer 142 is retracted to its first vertical position by the mixer elevator 144. As a result, the mixer shaft 148 and mixing blade(s) 1410 are not re-exposed to waste materials removed from them during the second cleaning cycle and are in a sanitary state for the next beverage to be produced.

The movement of the mixer 142 back to its first raised vertical position after the second cleaning cycle allows the control unit 16 to return the sanitizing chamber 49 in a slow and gradual manner to its first retracted position. Once the mixer 142 and sanitizing chamber 49 are back in their first positions, the control unit 16 may begin production of the next beverage. At this point, the control unit 16 sends a "waste disposal" signal to the waste egress system 55. As before, this signal activates the solenoid actuated rod 77, which opens the waste drain line 71 and allows wastewater and waste materials from the second cleaning cycle to flow out of the chamber 49 and to the waste drain 75 and out of the apparatus 10. After a specific duration known to be sufficient to drain waste materials from the sanitizing chamber 49, the control unit 16 may proceed to close the waste drain line 71.

Cup Detection Unit 102

In this embodiment, the beverage production apparatus 10 comprises the cup detection unit 102 for detecting a cup received by the cup support 368 of the transporting unit 36.

In this case, the cup detection unit 102 also provides information on a size of the cup to the control unit 16, which can proceed to determine a quantity of each ingredient to be dispensed based not only on user input entered via the user interface 50, but also on the size of the cup.

More particularly, as different customers typically have a different level of thirst or hunger, the beverage production apparatus 10 can produce beverages in a plurality of sizes, such as small, medium and large, for example. However, producing a quality beverage of a given size with a consistent flavor and of adequate consistency may require different quantities of ingredients, such as shaved ice, water, flavoring ingredient(s), and/or milk product. As a result, there is a need to identify the size of beverage to be produced before production begins.

In this embodiment, a user (operator or customer) can proceeds to enter the size of a beverage to be produced via interaction with the user interface 50. However, methods requiring user intervention are subject to human-error that could result in the addition of quantities of beverage ingredients that are too large for the cup used and result in the spillage of excess ingredients from the cup. Of course, another potential problem with similar consequences can arise when a user simply omits to place a cup in the apparatus 10 and proceeds to request a beverage via the user interface 50 with no cup in place. This unwanted result not only requires that an operator spend time to clean up the spillage, but also prevents customers from producing beverages during this period, thus further reducing potential revenues. It may thus be useful to confirm that (1) a cup has indeed been placed in the apparatus 10 by a user who has requested a beverage via the user interface 50 and (2) that the cup placed by the user is suitably sized for the size of the beverage requested by the user via the user interface 50 and/or to correctly identify the size of a beverage to be produced without requiring user intervention.

To that end, the apparatus 10 is equipped with the cup detection unit 102, which is operative to detect a cup when the cup is received by the cup support 368 of the transporting unit 36 and to provide information on a size of the cup to the control unit 16.

In this embodiment, the cup detection unit 102 comprises a cup sensor 104 that is mounted to a sensor housing 106. The cup sensor 104 may be a sensor of any type that is capable of detecting an object and measure certain characteristics about that object, such as its size and dimensions within a certain defined area of perception. The cup sensor 104 may comprises a single physical sensing element in a particular location or a plurality of physical sensing elements that are deployed over a defined area.

The cup sensor 104 may use any method to detect and measure a cup, including:

Optical means, such as producing optical beams in the visible and/or non-visible spectrums.

Auditory means, such as producing sound waves at ultrasonic frequency.

Tactile means, such as identifying the weight of an empty cup.

These are only examples of cup detection and cup size measurement technologies as other possibilities exist. In addition, it will be appreciated that the cup sensor 104 may use one or more means of detection and measurement singly or in combination. For example, the cup sensor 104 may detect a cup by one means (such as by tactile means when a cup is inserted) but measure its dimensions using another means, such as by using an optical laser measuring device or an ultrasonic wave measuring device.

It may be possible that the cup sensor 104 can be run in a variety of modes, including active and passive detection modes. In active detection mode, the cup sensor 104 is running independently, seeking to detect and measure a cup within its area of perception. When ran in this mode, the cup sensor 104 can detect the insertion of a cup independently of other components of the beverage production apparatus 10, such as the control unit 16. However, running the cup sensor 104 continually in this mode may consume more energy, as well as shorten its operational lifespan. In contrast, the cup sensor 104 that is in passive detection mode does not run until activated by some outside stimulus, such as a signal from another unit (e.g., the control unit 16). Once activated, however, it acts to detect and measure a cup within its area of perception in the same way as if it was running in active mode. When run in this mode, the cup sensor 104 cannot detect the insertion of a cup independently of other components of the apparatus 10, such as the control unit 16. However, running the sensor in this mode may conserve energy and extend its operational lifespan.

It should be noted that these detection modes are examples only as other possibilities exist. In addition, the cup sensor 104 may switch between different detection modes independently or in response to an external signal, as will be illustrated below.

The sensor housing 106 provides a container in which the cup sensor 104 is mounted in order to protect the cup sensor 104 and allow it to be integrated within the housing 13, particularly in proximity to the cup entry/exit station 3610. The sensor housing 106 also provides components that control the operation of the cup sensor 104 and allow it to communicate with other components within the apparatus, particularly the control unit 16 and the transporting unit 36. It should also be noted that although the cup sensor 104 and the associated sensor housing 106 are presented here as separate components, it is conceivable that they may also be integrated within a single component.

An example of operation of the cup detection unit 102 will now be presented. In this example, assume the following conditions exist beforehand:

the sensor 104 is running in active detection mode and operation of the cup detection unit 102 can occur independently of the general operation of the apparatus 10 (e.g., customer could insert a cup and have it detected and measured before making any selection using the user interface 50 for the beverage to be produced in it);

the cup sensor 104 uses in this embodiment auditory means to detect and measure a cup, specifically using ultrasonic sound waves to detect a cup and measure its dimensions;

a customer wants the apparatus 10 to produce a large (e.g., 28 ounce) milkshake with a mocha (e.g., coffee/chocolate) flavor; and the operator charges a single price per beverage, irrespective of its type and/or number of flavorings and that the customer has already paid for the beverage and has access to the apparatus 10.

The customer initially selects a large-sized cup from a selection of cups that are proximate to the apparatus 10 and that correspond to one of three (3) categories: small, medium and large. The customer inserts the cup into the cup support 368 of the transporting unit 36 that is currently positioned at the cup entry/exit station 3610.

Because the cup sensor 104 is running in active detection mode, it detects the insertion of the cup by the customer to the cup support 368 by a change in the ultrasonic waves reflected by the cup. As a result, the cup detection unit 102 sends a "cup detection" signal to the control unit 16 to alert it of this action.

The control unit 16 may react to the "cup detection" signal sent by the cup detection unit 102 by doing any the following actions:

If the apparatus 10 is running in a low-power energy consumption mode, the "cup detection" signal could cause the control unit 16 to shift the apparatus 10 to a normal power mode.

If the apparatus 10 is already running at normal power, the "cup detection" signal could cause it to prepare to receive user input from a customer or operator via the user interface 50.

If the apparatus 10 is currently preparing a beverage (meaning that the customer inserted a cup into the cup entry/exit station 3610 while the transporting unit 36 is currently active), the control unit 16 could suspend operation of the transporting unit 36 and/or the apparatus 10 as a whole to prevent the cup (and/or a person's hand) from being struck by the transporting unit 36. In addition, the control unit 16 could alert the customer/operator of the need to remove the cup through visual or auditory means, such as an alarm.

If the cup sensor 104 contains separate physical sensing elements for cup detection and cup size measurement, the control unit 16 may activate the latter sensing elements to measure the size of the inserted cup.

For this example, assume that the apparatus 10 is currently active and is running at normal power. In this case, the control unit 16 replies to the "cup detection" signal by sending a "cup size detect" signal to the cup detection unit 102 in order to obtain information regarding a size of the cup. Upon receipt of this signal, the cup detection unit 102 activates the measurement functionality of the cup detection sensor 102 to determine the size of the cup.

In this case, the cup detection sensor 102 looks at the degree of change in the reflected ultrasonic waves and compares it against a known list for small-, medium- and large-sized cups. Because the degree of change in this instance matches that of large-sized cups, the cup detection sensor 102 determines that the customer has inserted a large sized cup into the apparatus 10.

With the cup size information now obtained, the cup detection unit 102 sends a signal back to the control unit 16 conveying the size of the cup inserted, specifically a "large cup" signal. Upon receipt of this signal, the control unit 16 can determine the relative quantities of milk product, shaved ice, water and flavor additives that will need to be dispensed to the cup before mixing can take place. These quantities may be expressed in terms of a measurement (such as a volume or weight), or more particularly, a duration during which the control unit 16 must send a particular signal to a given unit to dispense the corresponding ingredient. For example, the control unit 16 may determine that to produce the desired amount of mocha flavor for a large-sized beverage, it will have to send "flavor dispense" signals to the additive transport systems 265 for both the chocolate and coffee flavor additives for seven (7) seconds.

These beverage ingredient values (and their associated signal durations) may be pre-programmed into the control unit 16 or they may be calculated by the unit 16 for each beverage based on other factors, such as the level of milk product or of a particular flavor ingredient. When such calculations are used, the control unit 16 can modify the signal durations to produce a beverage of consistent flavoring and quality based on its current status of each unit. Continuing the previous example, if the additive transport system 265 for the coffee additive reports that there is little additive left, the control unit 16 may send the "flavor dispense" signal to this transport system 265 for a longer duration (e.g., 8 or 9 seconds) in order to extract the needed amount of flavor additive from the almost-empty flavor additive pouch 264.

Once the values for the beverage ingredients are known to (or are calculated by) the control unit 16, it sends the first "transport" signal to activate the transporting unit 36 and begin the beverage production process.

At this point, the cup detection unit 102 may not be needed until the finished beverage has been removed from the apparatus 10 by the customer. During this period, the control unit 16 may shift the cup sensor 104 from active to passive detection mode or deactivate the entire unit 102 to conserve power. Upon removal of the produced milkshake by the customer, the control unit 16 reactivates the unit 102 and/or returns the cup sensor 104 to its prior detection mode (e.g., active detection mode) so it can detect the insertion of the cup for the next beverage.

While in the embodiment considered above, the information about the size of the cup is derived by the cup detection unit 102 and communicated to the control unit 16, in other embodiments, the control unit 16 may be responsible for deriving this cup size information based on one or more signals transmitted by the cup detection unit 102.

Also, while in the embodiment considered above, the cup detection unit 102 sends different signals to convey to the control unit 16 that the cup has been detected and to allow the control unit 16 to obtain the information about the size of the cup, in other embodiments, the cup detection unit 102 may send a single signal that conveys both detection of the cup and an indication of its size.

It will be noted that the operation in the example presented above would also apply to the cup detection unit 102 that runs the cup sensor 104 in passive detection mode, except that the sensor 104 may not have detected the cup and sent the subsequent "cup detection" signal until after it had been activated by an external unit, such as through the receipt of a "cup detect" signal sent by the control unit 16.

It will also be noted that the cup detection unit 102 and control unit 16 may be able to identify situations where a customer has entered the desired parameters for their beverage and initiated production, but has not yet inserted a cup in which it should be prepared. In such a situation, the unit 102 can send a "cup not found" signal to the control unit 16, which may cause activities to alert the customer or operator to the situation, such as through a visual or auditory alarm.

Control Unit 16

The control unit 16 comprises suitable hardware, software and/or control logic for generating various control signals to cause various operations to be performed by the beverage production apparatus 10, in response to various inputs that it receives.

More particularly, the beverage production apparatus 10 comprises a plurality of components that perform (or support) the activities involved in beverage production, such as the dispensing system 12, the transporting unit 36, the sanitizing unit 37 and the cup detection unit 102. Because beverage production follows a general process that dictates when certain actions performed by these components should occur, there is a need to coordinate the individual activities of each of these components according to this larger process.

In addition, it is useful to provide a customer or operator with a way of communicating with the apparatus 10 to do the following:

provide parameters for a beverage to be produced, such as its beverage type, size, and ingredients (e.g., flavoring ingredient(s));

monitor the progress of a beverage during its production; and learn of problems that prevent the normal operation of the apparatus 10 either now or in the future, such as a flavor pouch that is about to be or has become empty.

The control unit 16 both manages the activities of other components of the beverage production apparatus 10 and provides a way for customers and operators to communicate with the apparatus 10. In this embodiment, the control unit 16 comprises:

the user interface 50 allowing a user to provide user input, for instance, to request a beverage; and a controller 162 allowing receipt, processing and reaction to input from both a user via the user interface 50 as well as from other components of the apparatus 10.

The user interface 50 acts as the interface between a user (who could be an operator or customer) and the beverage production apparatus 10. The user interface 50 comprises one or more input device 52 allowing the user to input information to the beverage production apparatus 10. The one or more input devices 52 may include buttons, switches and/or various other input elements. The input elements of the one or more input device 52 may be organized within groups in a way that helps a prospective user better navigate the user interface 50 and use the apparatus 10. For example, input elements of the one or more input devices 52 related to beverage flavors can be grouped together to allow a user to quickly locate these on the user interface 50. When combined with graphic design elements, these groupings may allow a user to efficiently input their beverage parameters to the apparatus 10 with a minimum of instruction.

In addition, in this embodiment, the user interface 50 comprises one or more output devices to convey information to the user. More specifically, in this case, the user interface 50 comprises a display screen (e.g., an LCD panel) 54 that is used to display alphanumeric text messages to the user regarding items like beverage selection, the current status of a beverage being produced and the overall condition of the apparatus 10. The display screen 54 can also be used to communicate other information, such as the current price of a beverage, where the price of a beverage may vary depending on the type of beverage and the number or type of flavors selected. The user interface 50 may also comprise other output devices, such as a speaker (e.g., to issue auditory messages or alarms).

While the user interface 50 is configured in a particular way in this embodiment, it will be recognized that the user interface 50 may be configured in various other ways in other embodiments. For example, the user interface 50 may be subdivided into zones that allow a user to navigate and select from a menu of selections displayed on the display screen 54. As another example, the display screen 54 may be a touch-sensitive screen acting as an input device of the user interface 50 to allow a user to enter information by "pressing" or otherwise acting upon virtual input elements displayed thereon.

The controller 162 comprises suitable hardware, software, and/or control logic that allow the control unit 16 to receive signals from, process and send signals to both other components of the apparatus 10, such as the dispensing system 12 or the transporting unit 36, as well as to users via the display screen 54 (and/or other output device(s) of the user interface 50). The controller 162 provides the ability for the control unit 16 to provide all control and coordination functionality for all other units within the apparatus 10. However, this functionality may be provided by the controller 162 in a variety of different configurations. For example, in one configuration, the controller 162 may comprise a single physical control component (e.g., a control board), while in other configurations, the controller 162 may comprise a plurality of physical control components. For instance, in one embodiment, the controller 162 may comprise a "master controller" that directs overall operations and "slave controllers" that are integrated within units and that allow their given unit to send, receive and react to information (sent as signals) provided by the master controller or by other slave controllers within the apparatus 10.

It will be appreciated that, in some embodiments, certain functionality of a given component of the control unit 16 may be implemented as pre-programmed hardware and/or firmware elements (e.g., application specific integrated circuits (ASICs), electrically erasable programmable read-only memories (EEPROMs), etc.) or other related elements. In other embodiments, a given component of the control unit 16 may comprise a general-purpose processor having access to a storage medium that is fixed, tangible, and readable by the general-purpose processor and that stores program code for operation of the general-purpose processor to implement functionality of that given component. The storage medium may store data optically (e.g., an optical disk such as a CD-ROM or a DVD), magnetically (e.g., a hard disk drive, a removable diskette), electrically (e.g., semiconductor memory, including ROM such as EPROM, EEPROM and Flash memory, or RAM), or in any another suitable way. Alternatively, the program code may be stored remotely but transmittable to the given component via a modem or other interface device connected to a network over a transmission medium. The transmission medium may be either a tangible medium (e.g., optical or analog communications lines) or a medium implemented using wireless techniques (e.g., RF, microwave, infrared or other wireless transmission schemes).

Up to now, the components and operation of each unit of the beverage production apparatus 10 have been described relatively independently, with passing reference made to signals sent by or received from the control unit 16 that cause the unit to perform a particular function. However, the operation of the control unit 16 in providing communication and co-ordination functionality to external users and/or internal units can be better understood within the larger context of the general operation of the entire apparatus 10. Thus, the operation of the control unit 16 will be presented below through an example showing the general operation of the beverage production apparatus 10.

Example of Operation

In this example, it is assumed that a customer wants a smoothie that is flavored with both banana and mango and also contains an energy enhancer. The following assumptions are made regarding the initial status of the beverage production apparatus 10 before use:

The apparatus 10 is functioning normally and contains a quantity of ice and milk product sufficient to produce the beverage;

Both banana and mango flavor additives are available and their supply is adequate for flavoring the beverage;

The energy enhancer is provided as a single ingredient that is available and is added to beverages in the same manner and at the same station as flavor additives; and The operator allows customers to use the apparatus 10 to produce their beverage and charges them a flat fee per beverage regardless of the size or number of additives for the beverage.

The customer first uses the user interface 50 (namely the one or more input devices 52 and the display screen 54) to communicate the following parameters for their beverage to the apparatus 10:

type of beverage: smoothie (frozen beverage)
flavorings: banana, mango
additional ingredient: energy enhancer With these parameters entered and communicated to the controller 162 via the user interface 50, the customer then interacts with the user interface 50 to initiate beverage production. This triggers the control unit 16 to send a "cup detect" signal to the cup detection unit 102 in order to identify the size of the cup and so determine the correct amounts of milk product, shaved ice, flavoring ingredients and energy enhancer that need to be dispensed and mixed to produce the smoothie.

Upon receipt of this signal, the cup detection unit 102 activates the cup sensor 104, which attempts to detect and measure the cup inserted to the transporting unit 36 at the cup entry/exit station 3610 by sending out ultrasonic sound waves. However, in this example, it is assumed that no cup has yet been placed and thus the ultrasonic waves reflected back to the sensor 104 show that no cup yet been inserted. As a result, the cup detection unit 102 sends a "cup not found" signal back to the control unit 16.

When the control unit 16 receives this signal, it displays a message on the display screen 54 and provides an alternate visual and/or auditory prompt to ask the customer to insert the cup into the transporting unit 36 at the cup entry/exit station 3610. At the same time, the control unit 16 shifts the cup sensor 104 into active detection mode so it can monitor the station 3610 and identify the insertion of a cup independently.

As a result of these prompts, the customer inserts a large size cup to the cup support 368. Because the cup sensor 104 is running in active detection mode, it detects the insertion of the cup and correctly identifies its size. This information is sent by the cup detection unit 102 to the control unit 16 through a "large cup" signal, which allows the unit 16 to determine the quantities of milk product, shaved ice, flavoring ingredients and energy enhancer needed for the smoothie.

Next, the control unit 16 sends a first "transport signal" to the transporting unit 36 to rotate the cup from the cup entry/exit station 3610 to the milk product dispensing station 3612. Once at this station, the control unit 16 sends a "milk product dispense signal" to the milk product dispensing unit 30 that causes it to dispense the required quantity of milk product into the cup.

When the quantity of milk product required for the smoothie has been added to the cup, the control unit 16 sends a second "transport signal" to the transporting unit 36 that to rotate the cup from the milk product dispensing station 3612 to the ice/water/flavor dispensing station 3614. Once at this station, the control unit sends a "fragment" signal to the ice fragmentation unit 24 that produces and dispenses the required quantity of shaved ice from ice cubes stored in the ice supply unit 22.

While the shaved ice for the smoothie is being generated by the ice fragmentation unit 24, the control unit 16 proceeds to add the desired banana and mango flavoring ingredients to the beverage via the flavor dispensing unit 26, as well as the ancillary ingredients for the energy enhancer.

The control unit 16 sends a "flavor dispense" signal to the respective additive transport units 265 for the banana flavoring ingredient and the mango flavoring ingredient that causes the required quantity of flavoring ingredient to be drawn from each of their respective flavor additive pouches 264. The control unit 16 also sends a similar signal to the unit responsible for ancillary ingredients in order to extract and dispense the required quantity of the energy enhancer for the beverage, which may be performed using a process similar to that identified for the flavoring ingredients above.

During this period, the required quantities of flavoring ingredients and the energy enhancer ingredient for the smoothie are added to and become mixed with the shaved ice that is currently being produced by the ice fragmentation unit 24 within the cup. When ice production ceases, the control unit 16 may send a "water dispense" signal to the water dispensing unit 28 that causes the flow of a given amount of fresh, non-heated water that washes any remaining flavor or ancillary ingredients from the ingredient chute 267 to the cup. In this way, cross-flavor contamination for future beverages can be prevented from occurring through the ice fragmentation unit 24 while ensuring that as much of the flavor ingredients are conveyed to the cup as possible before ingredient intermixing occurs.

Once the units 24, 26 and 28 have added the required amounts of shaved ice, flavoring ingredients, energy enhancer ingredient and water for the smoothie, the control unit 16 sends a third "transport signal" to the transporting unit 36 to rotate the cup from the station 3614 to the mixing station 3616. Once at this station, the control unit 16 sends a set of "intermix prepare", "intermix" and "intermix blend" sisals to the mixing unit 14 that blends the beverage ingredients added previously for a specified duration.

At the end of the mixing process, the smoothie contains desired flavors, energy enhancer and consistency and is ready to be served to the waiting customer. The control unit 16 then sends a fourth "transport signal" to the transporting unit 36 to rotate the cup from the mixing station 3616 to the cup entry/exit station 3610.

Once the transporting unit 36 moves the cup containing the completed smoothie out of the mixing station 3616, the control unit 16 may begin sanitation activities to clean the mixer. The control unit 16 sends a sequence of signals to the sanitizing unit 37 (as well as a second set of signal to the mixer unit 14) in order to perform cleaning operations that sanitize the mixer 142. At this point, the apparatus 10 is ready to produce another beverage, the parameters of which may already have been entered by a customer through the user interface 50.

When the cup containing the smoothie reappears at the cup entry/exit station 3610, the apparatus 10 indicates that production of the customer's beverage is complete and their beverage is ready for consumption. (It is worth noting that the customer may have been kept fully informed regarding the status of their beverage through messages displayed on the display screen 54 or elsewhere on the user interface 50, such as via a set of progress LEDs (not shown).) The customer extracts the cup containing the completed smoothie from the cup support 368, can add one or more condiment and/or insert a straw or other beverage consumption aid, such as a spoon, and can pay the operator for the beverage produced by the apparatus 10.

While this example showed the process used in producing a frozen beverage, the same general operation could be used by the apparatus 10 to produce a hot beverage, such as a coffee, cappuccino or mocha beverage, with one major difference being that heated water would be added to the cup rather than shaved ice. Advantageously, this allows an operator to use a single machine to produce frozen and heated beverages throughout the year, rather than seasonally as with dedicated hot- or frozen beverage machines. The provision of such an apparatus increases both the utilization efficiency of an operator's counter space, as well as their potential revenues through year-round operation.

In embodiments considered herein, the beverage production apparatus 10 prepares a beverage requested by a customer or operator directly in a cup in which the beverage is served. In other embodiments, the beverage production apparatus 10 may prepare a beverage requested by a customer or operator in another container and subsequently transfer the prepared beverage into a cup in which the beverage is served. For example, in some embodiments, when a beverage is requested via the user interface 50, the transporting unit 36 may transport a preparation container between the stations 3612, 3614 and 3616 where the dispensing system 12 dispenses ingredients for the beverage into the preparation container and the mixing unit 14 mixes these ingredients in the preparation container, at which point the prepared beverage in the preparation container can be transferred into a cup that can be retrieved at the station 3610.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. An apparatus for producing frozen beverages, the apparatus including:
 a control unit including a user interface, the user interface configured to allow a user to input a request for a frozen beverage, the request being indicative of at least a desired flavor, the control unit producing signals based on the request;
 a dispensing system responsive to signals from the control unit indicative of the desired flavor and a beverage size, the dispensing system configured for dispensing ingredients for the requested frozen beverage into a cup in which the requested frozen beverage is to be served, the dispensing system including:
  an ice dispensing apparatus configured to store ice in sufficient quantity for multiple frozen beverages, and further configured to dispense a quantity of the ice for the requested frozen beverage in accordance with said beverage size;

a flavoring ingredient dispensing unit configured to store a plurality of supplies of flavoring ingredients, and further configured to dispense at least one flavoring ingredient from the supplies of flavoring ingredients in accordance with said desired flavor; and a mixing unit responsive to at least one of the signals from the control unit, for mixing in the cup the dispensed ice and the dispensed at least one flavoring ingredient.

2. The apparatus defined in claim 1, wherein the ice dispensing apparatus includes an ice supply unit with a chamber for receiving ice from an external source.

3. The apparatus defined in claim 1, wherein the ice dispensing apparatus includes an ice supply unit with an ice maker for making ice using water from a water supply line.

4. The apparatus defined in claim 1, wherein after the mixing unit stops mixing, the cup contains fragmented ice.

5. The apparatus defined in claim 1, further including:
a cup detection unit configured to detect presence of a cup provided to the apparatus;
wherein the control unit is configured to produce the signals on condition that presence of the cup has been detected by the cup detection unit.

6. The apparatus defined in claim 1, wherein the request is further indicative of said beverage size.

7. The apparatus defined in claim 1, further comprising:
a detector configured to determine said beverage size by detecting a size of the cup when provided to the apparatus.

8. The apparatus defined in claim 1, wherein the flavoring ingredient is further configured to dispense a quantity of the at least one flavoring ingredient in accordance with said size.

9. An apparatus for producing frozen beverages, the apparatus including:
a control unit including a user interface, the user interface configured to allow a user to input a request for a frozen beverage, the control unit producing signals based on the request;
a cup support for supporting a cup provided to the apparatus, the cup having an initial position when supported by the cup support;
a dispensing system responsive to at least one of the signals from the control unit, for dispensing ice and at least one flavoring ingredient into the cup in accordance with the request;
a mixing unit responsive to at least one of the signals from the control unit, for mixing the dispensed ice and at least one flavoring ingredient in the cup;
wherein at least one of the dispensing and the mixing occurs while the cup is rotated away from its initial position.

10. The apparatus defined in claim 9, further including a transporting unit configured to move the cup during production of the requested frozen beverage.

11. The apparatus defined in claim 9, further including:
a plurality of stations, including:
a dispensing station at which the dispensing system dispenses the ice and the at least one flavoring ingredient into the cup; and
a mixing station at which the mixing unit mixes the dispensed ice and the dispensed at least one flavoring ingredient in the cup.

12. The apparatus defined in claim 11, further comprising:
a transporting unit responsive to at least one of the signals from the control unit, for transporting the cup from the dispensing station to the mixing station.

13. The apparatus defined in claim 12, the dispensing station being a second dispensing station, the plurality of stations further comprising:
a first dispensing station at which the dispensing system dispenses at least one other one or more of the ingredients of the requested frozen beverage into the cup;
the transporting unit configured for transporting the cup from the first dispensing station to the second dispensing station before transporting the cup from the second dispensing station to the mixing station.

14. The apparatus defined in claim 13, wherein the dispensing system includes an ice dispensing apparatus configured to store ice in sufficient quantity for multiple frozen beverages, and further configured to dispense the ice into the cup.

15. The apparatus defined in claim 14, further including:
a flavoring ingredient dispensing unit configured to store a plurality of supplies of flavoring ingredients, and further configured to dispense the at least one flavoring ingredient from the supplies of flavoring ingredients in accordance with the desired flavor.

16. The apparatus defined in claim 9, wherein the request is indicative of at least a desired flavor of the requested frozen beverage.

17. The apparatus defined in claim 9, wherein both the dispensing and the mixing occur while the cup is rotated away from its initial position.

18. An apparatus for producing frozen beverages, the apparatus including:
a cup detection unit configured to detect presence of a cup provided to the apparatus;
a control unit including a user interface, the user interface configured to allow a user to input a request for a frozen beverage, the request being indicative of at least a desired flavor, the control unit responsive to the request to produce at least one dispense signal and at least one mix signal on condition that the cup detection unit detects presence of the cup;
a dispensing system responsive to the at least one dispense signal from the control unit, for dispensing ingredients for the requested frozen beverage into the cup, the dispensing system including:
an ice dispensing apparatus configured to dispense a quantity of ice for the requested frozen beverage;
a flavoring ingredient dispensing unit configured to dispense at least one flavoring ingredient from the supplies of flavoring ingredients in accordance with the desired flavor; and
a mixing unit responsive to the at least one mix signal from the control unit, for mixing the dispensed ingredients in the cup.

19. The apparatus defined in claim 18, wherein the cup detection unit is further configured to detect a size of the cup provided to the apparatus, wherein the quantity of ice dispensed is dependent on the detected cup size.

20. The apparatus defined in claim 18, wherein the request for the frozen beverage is indicative of a beverage size, wherein the quantity of ice dispensed is dependent on the beverage size.

21. An apparatus for producing frozen beverages, the apparatus including:
a control unit including a user interface, the user interface configured to allow a user to input a request for a frozen beverage, the request being indicative of at least a desired flavor;
a detector configured to detect a size of a cup provided to the apparatus;

a dispensing system for dispensing a quantity of ice and at least one flavoring ingredient for the requested frozen beverage in accordance with the desired flavor and the detected cup size;

a mixing unit for in-cup mixing of the dispensed ice and the dispensed at least one flavoring ingredient.

22. An apparatus for producing frozen beverages, the apparatus including:
- a control unit including a user interface, the user interface configured to allow a user to input a request for a frozen beverage, the request being indicative of at least a desired flavor combination, the control unit producing signals based on the request;
- a dispensing system responsive to signals from the control unit, for dispensing ingredients for the requested frozen beverage into a cup in which the requested frozen beverage is to be served, the dispensing system including:
  - an ice dispensing apparatus configured to dispense some of the ice for the requested frozen beverage;
  - a flavoring ingredient dispensing unit configured to store a plurality of supplies of flavoring ingredients, and further configured to dispense multiple flavoring ingredients from the supplies of flavoring ingredients in accordance with the desired flavor combination; and
- a mixing unit responsive to at least one signal from the control unit, for mixing in the cup the dispensed ice and the dispensed multiple flavoring ingredients.

23. An apparatus for producing frozen beverages, the apparatus including:
- a control unit including a user interface, the user interface configured to allow a user to input a request for a frozen beverage, the control unit producing signals based on the request;
- a dispensing system responsive to at least one of the signals from the control unit, for dispensing ingredients for the requested frozen beverage into a cup in which the requested frozen beverage is to be served, the dispensing system including:
  - an ice dispensing apparatus configured to dispense a quantity of ice for the requested frozen beverage;
  - a flavoring ingredient dispensing unit configured to store a plurality of supplies of flavoring ingredients, and further configured to dispense a quantity of at least one flavoring ingredient from the supplies of flavoring ingredients;
- a mixing unit responsive to at least one signal from the control unit, for mixing in the cup the dispensed ice and the dispensed at least one flavoring ingredient; and
- a sanitizing unit configured to sanitize the mixing unit after the mixing unit has mixed the ingredients of the frozen beverage in the cup.

24. The apparatus defined in claim 23, wherein the mixing unit comprises a mixing element configured to extend into the cup, wherein the sanitizing unit includes a sanitizing chamber configured to contain a sanitizing solution, the mixing element being movable relative to the sanitizing chamber to dip the mixing element into the sanitizing solution.

25. The apparatus defined in claim 23, further comprising a mixing station where the mixing occurs, the control unit being further configured to trigger operation of the sanitation unit in response to determining that the cup has been removed from the mixing station.

26. The apparatus defined in claim 23, wherein the mixing unit comprises a mixing element configured to extend into the cup, and wherein the sanitizing unit implements a plurality of cleaning cycles for sanitizing the mixing unit, a first one of the cleaning cycles involving contact of the mixing element with hot water and a second one of the cleaning cycle involving contact of the mixing element with a solution of sanitizing agent.

27. The apparatus defined in claim 23, wherein the ice is stored in an ice chamber, the apparatus further including a showering unit configured to shower liquid inside the ice chamber.

28. The apparatus defined in claim 23, wherein the liquid contains at least one of heated water and a sanitizing agent.

29. An apparatus for producing frozen beverages, the apparatus including:
- a control unit including a user interface, the user interface configured to allow a user to input a request for a frozen beverage, the request being indicative of at least a desired beverage consistency from among a plurality of consistencies producible by the apparatus, the control unit producing signals based on the request;
- a dispensing system responsive to at least one of the signals from the control unit, for dispensing ice and at least one flavoring ingredient into a cup;
- a mixing unit responsive to at least one of the signals from the control unit, for mixing in the cup the dispensed ice and at least one flavoring ingredient in accordance with the desired beverage consistency.

30. The apparatus defined in claim 29, wherein the plurality of consistencies includes at least two of: a consistency of a slush beverage producible by the apparatus, a consistency of a smoothie beverage producible by the apparatus and a consistency of a milkshake beverage producible by the apparatus.

31. The apparatus defined in claim 29, wherein the at least one of the signals from the control unit to which the mixing unit is responsive includes an intermix signal and an intermix blend signal, wherein the mixing unit is responsive to the intermix signal to cause a mixing element to rotate about a vertical axis until a predetermined rotational speed is reached, and wherein the mixing unit is responsive to the intermix blend signal to cause the mixing element to move vertically.

32. The apparatus defined in claim 31, wherein different ones of the consistencies are achieved by control of the durations of the intermix signal and the intermix blend signal and of the rotational speed of the mixing element.

* * * * *